(12) United States Patent  (10) Patent No.: US 8,149,716 B2
Ramanathan et al.  (45) Date of Patent: Apr. 3, 2012

(54) SYSTEMS AND METHODS FOR ADAPTIVE ROUTING IN MOBILE AD-HOC NETWORKS AND DISRUPTION TOLERANT NETWORKS

(75) Inventors: Subramanian Ramanathan, Westford, MA (US); Prithwish Basu, Cambridge, MA (US); Richard Earl Hansen, Somerville, MA (US); Christine Elaine Jones, Spokane Valley, WA (US); Rajesh Krishnan, North Billerica, MA (US); Regina Rosales Hain, Winchester, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 219 days.

(21) Appl. No.: 12/229,039

(22) Filed: Aug. 18, 2008

(65) Prior Publication Data
US 2009/0129316 A1  May 21, 2009

Related U.S. Application Data

(60) Provisional application No. 60/965,573, filed on Aug. 20, 2007.

(51) Int. Cl.
*H04L 12/28* (2006.01)
*H04W 4/00* (2009.01)
*G01R 31/08* (2006.01)
(52) U.S. Cl. .................. 370/238; 370/351; 370/338
(58) Field of Classification Search .................. 370/465, 370/466, 351, 236, 238, 238.1, 241.1, 252, 370/254, 392, 338, 328, 329, 395.42, 400
See application file for complete search history.

(56) References Cited

U.S. PATENT DOCUMENTS

| | | | |
|---|---|---|---|
| 4,964,121 A | 10/1990 | Moore | |
| 5,128,938 A | 7/1992 | Borras | |
| 5,203,020 A | 4/1993 | Sato et al. | |
| 5,301,225 A | 4/1994 | Suzuki et al. | |
| 5,418,539 A | 5/1995 | Sezai et al. | |
| 5,430,731 A | 7/1995 | Umemoto et al. | |
| 5,583,866 A | 12/1996 | Vook et al. | |
| 5,590,396 A | 12/1996 | Henry | |
| 5,649,108 A * | 7/1997 | Spiegel et al. | 709/241 |
| 5,710,975 A | 1/1998 | Bernhardt et al. | |
| 5,754,790 A * | 5/1998 | France et al. | 709/238 |
| 5,790,946 A | 8/1998 | Rotzoll | |
| 5,987,024 A | 11/1999 | Duch et al. | |
| 6,016,322 A | 1/2000 | Goldman | |
| 6,028,853 A | 2/2000 | Haartsen | |
| 6,052,779 A | 4/2000 | Jackson et al. | |
| 6,058,106 A | 5/2000 | Cudak et al. | |
| 6,097,957 A | 8/2000 | Bonta et al. | |

(Continued)

OTHER PUBLICATIONS

Office Action dated Jan. 13, 2011 U.S. Appl. No. 11/895,527.

(Continued)

*Primary Examiner* — Hanh Nguyen
(74) *Attorney, Agent, or Firm* — Ropes & Gray LLP

(57) ABSTRACT

The systems and methods described herein include adaptive routing processes for packet-based wireless communication networks. This routing approach works both in MANETs (when a contemporaneous end-to-end path is available) and in DTNs (when a contemporaneous end to end path is not available, but one of formed over space and time). In particular, the methods include adaptively selecting a routing process for transmitting a packet through a node in the network based on available information on the network topology and/or the contents of the packet.

31 Claims, 7 Drawing Sheets

U.S. PATENT DOCUMENTS

| | | | |
|---|---|---|---|
| 6,104,708 A | 8/2000 | Bergamo | |
| 6,118,769 A | 9/2000 | Pries et al. | |
| 6,127,799 A | 10/2000 | Elliott et al. | |
| 6,130,881 A | 10/2000 | Stiller et al. | |
| 6,188,911 B1 | 2/2001 | Wallentin et al. | |
| 6,192,230 B1 | 2/2001 | van Bokhorst et al. | |
| 6,208,247 B1 | 3/2001 | Agre et al. | |
| 6,243,579 B1 | 6/2001 | Kari et al. | |
| 6,262,684 B1 | 7/2001 | Stewart et al. | |
| 6,292,508 B1 | 9/2001 | Hong et al. | |
| 6,304,215 B1 | 10/2001 | Proctor, Jr. et al. | |
| 6,359,901 B1 | 3/2002 | Todd et al. | |
| 6,374,311 B1 | 4/2002 | Mahany et al. | |
| 6,377,211 B1 | 4/2002 | Hsiung | |
| 6,381,467 B1 | 4/2002 | Hill et al. | |
| 6,400,317 B2 | 6/2002 | Rouphael et al. | |
| 6,404,386 B1 | 6/2002 | Proctor, Jr. et al. | |
| 6,414,955 B1 | 7/2002 | Clare et al. | |
| 6,418,148 B1 | 7/2002 | Kumar et al. | |
| 6,463,307 B1 | 10/2002 | Larsson et al. | |
| 6,473,607 B1 | 10/2002 | Shohara et al. | |
| 6,476,773 B2 | 11/2002 | Palmer et al. | |
| 6,477,361 B1 | 11/2002 | LaGrotta et al. | |
| 6,490,461 B1 | 12/2002 | Muller et al. | |
| 6,498,939 B1 | 12/2002 | Thomas et al. | |
| 6,512,935 B1 | 1/2003 | Redi | |
| 6,564,074 B2 | 5/2003 | Romans et al. | |
| 6,574,269 B1 | 6/2003 | Bergamo | |
| 6,583,675 B2 | 6/2003 | Gomez | |
| 6,583,685 B1 | 6/2003 | Easter et al. | |
| 6,590,889 B1 | 7/2003 | Preuss et al. | |
| 6,598,034 B1* | 7/2003 | Kloth | 706/47 |
| 6,601,093 B1 | 7/2003 | Peters | |
| 6,611,231 B2 | 8/2003 | Crilly, Jr. et al. | |
| 6,611,233 B2 | 8/2003 | Kimura | |
| 6,671,525 B2 | 12/2003 | Allen et al. | |
| 6,694,149 B1 | 2/2004 | Ady et al. | |
| 6,714,983 B1 | 3/2004 | Koenck et al. | |
| 6,721,275 B1 | 4/2004 | Rodeheffer et al. | |
| 6,735,178 B1 | 5/2004 | Srivastava et al. | |
| 6,735,630 B1 | 5/2004 | Gelvin et al. | |
| 6,745,027 B2 | 6/2004 | Twitchell, Jr. | |
| 6,757,248 B1 | 6/2004 | Li et al. | |
| 6,760,584 B2 | 7/2004 | Jou | |
| 6,791,949 B1 | 9/2004 | Ryu et al. | |
| 6,804,208 B2 | 10/2004 | Cain et al. | |
| 6,816,115 B1 | 11/2004 | Redi et al. | |
| 6,859,135 B1 | 2/2005 | Elliott | |
| 6,888,819 B1 | 5/2005 | Mushkin et al. | |
| 6,894,975 B1 | 5/2005 | Partyka | |
| 6,894,991 B2 | 5/2005 | Ayyagari et al. | |
| 6,920,123 B1 | 7/2005 | Shin et al. | |
| 6,973,039 B2 | 12/2005 | Redi et al. | |
| 6,981,052 B1 | 12/2005 | Cheriton | |
| 6,990,075 B2 | 1/2006 | Krishnamurthy et al. | |
| 7,020,501 B1 | 3/2006 | Elliott et al. | |
| 7,020,701 B1 | 3/2006 | Gelvin et al. | |
| 7,027,392 B2 | 4/2006 | Holtzman et al. | |
| 7,046,639 B2 | 5/2006 | Garcia-Luna-Aceves et al. | |
| 7,058,031 B2 | 6/2006 | Bender et al. | |
| 7,072,432 B2 | 7/2006 | Belcea | |
| 7,088,678 B1 | 8/2006 | Freed et al. | |
| 7,103,344 B2 | 9/2006 | Menard | |
| 7,110,783 B2 | 9/2006 | Bahl et al. | |
| 7,133,398 B2 | 11/2006 | Allen et al. | |
| 7,142,520 B1 | 11/2006 | Haverinen et al. | |
| 7,142,864 B2 | 11/2006 | Laroia et al. | |
| 7,151,945 B2 | 12/2006 | Myles et al. | |
| 7,155,263 B1 | 12/2006 | Bergamo | |
| 7,165,102 B2 | 1/2007 | Shah et al. | |
| 7,184,413 B2 | 2/2007 | Beyer et al. | |
| 7,209,771 B2 | 4/2007 | Twitchell, Jr. | |
| 7,218,630 B1 | 5/2007 | Rahman | |
| 7,286,844 B1 | 10/2007 | Redi et al. | |
| 7,330,736 B2 | 2/2008 | Redi | |
| 7,342,876 B2 | 3/2008 | Bellur et al. | |
| 7,346,679 B2 | 3/2008 | Padmanabhan et al. | |
| 7,349,370 B2* | 3/2008 | Lee et al. | 370/328 |
| 7,363,371 B2 | 4/2008 | Kirkby et al. | |
| 7,369,512 B1 | 5/2008 | Shurbanov et al. | |
| 7,376,827 B1 | 5/2008 | Jiao | |
| 7,388,847 B2 | 6/2008 | Dubuc et al. | |
| 7,466,655 B1* | 12/2008 | Zhao | 370/238 |
| 7,489,635 B2* | 2/2009 | Evans et al. | 370/235 |
| 7,523,220 B2* | 4/2009 | Tan et al. | 709/243 |
| 7,542,437 B1 | 6/2009 | Redi et al. | |
| 7,551,892 B1 | 6/2009 | Elliott | |
| 7,583,654 B2 | 9/2009 | Zumsteg | |
| 7,599,443 B2 | 10/2009 | Ionescu et al. | |
| 7,664,055 B2 | 2/2010 | Nelson | |
| 7,668,127 B2 | 2/2010 | Krishnamurthy et al. | |
| 7,688,772 B2 | 3/2010 | Sinivaara et al. | |
| 7,719,989 B2 | 5/2010 | Yau | |
| 7,742,399 B2 | 6/2010 | Pun | |
| 7,764,617 B2* | 7/2010 | Cain et al. | 370/238 |
| 7,881,202 B2* | 2/2011 | Lansing et al. | 370/235 |
| 2002/0067736 A1 | 6/2002 | Garcia-Luna-Aceves et al. | |
| 2002/0071395 A1 | 6/2002 | Redi et al. | |
| 2002/0145978 A1 | 10/2002 | Batsell et al. | |
| 2002/0146985 A1 | 10/2002 | Naden | |
| 2002/0147816 A1 | 10/2002 | Hlasny | |
| 2002/0186167 A1 | 12/2002 | Anderson | |
| 2003/0037167 A1* | 2/2003 | Garcia-Luna-Aceves et al. | 709/238 |
| 2003/0066090 A1 | 4/2003 | Traw et al. | |
| 2003/0067892 A1 | 4/2003 | Beyer et al. | |
| 2003/0099210 A1 | 5/2003 | O'Toole et al. | |
| 2003/0114204 A1 | 6/2003 | Allen et al. | |
| 2003/0115369 A1 | 6/2003 | Walter et al. | |
| 2003/0119568 A1 | 6/2003 | Menard | |
| 2003/0152110 A1 | 8/2003 | Rune | |
| 2003/0179742 A1 | 9/2003 | Ogier et al. | |
| 2003/0185170 A1 | 10/2003 | Allen et al. | |
| 2003/0202490 A1 | 10/2003 | Gunnarsson et al. | |
| 2003/0222819 A1 | 12/2003 | Karr et al. | |
| 2004/0077353 A1 | 4/2004 | Mahany | |
| 2004/0125773 A1 | 7/2004 | Wilson et al. | |
| 2004/0176023 A1 | 9/2004 | Linder et al. | |
| 2004/0218580 A1 | 11/2004 | Bahl et al. | |
| 2004/0230638 A1 | 11/2004 | Balachandran et al. | |
| 2005/0009578 A1 | 1/2005 | Liu | |
| 2005/0059347 A1 | 3/2005 | Haartsen | |
| 2005/0124313 A1 | 6/2005 | Simpson et al. | |
| 2005/0134403 A1 | 6/2005 | Kajiya | |
| 2005/0135379 A1* | 6/2005 | Callaway et al. | 370/395.31 |
| 2005/0152329 A1 | 7/2005 | Krishnan et al. | |
| 2005/0176468 A1 | 8/2005 | Iacono et al. | |
| 2005/0185632 A1 | 8/2005 | Draves et al. | |
| 2005/0207376 A1 | 9/2005 | Ashwood-Smith et al. | |
| 2005/0215196 A1 | 9/2005 | Krishnan et al. | |
| 2005/0215280 A1 | 9/2005 | Twitchell, Jr. | |
| 2006/0007865 A1 | 1/2006 | White et al. | |
| 2006/0010249 A1* | 1/2006 | Sabesan et al. | 709/238 |
| 2006/0013160 A1 | 1/2006 | Haartsen | |
| 2006/0047807 A1 | 3/2006 | Magnaghi et al. | |
| 2006/0058102 A1 | 3/2006 | Nguyen et al. | |
| 2006/0068837 A1 | 3/2006 | Malone | |
| 2006/0107081 A1 | 5/2006 | Krantz et al. | |
| 2006/0126514 A1* | 6/2006 | Lee et al. | 370/238 |
| 2006/0135145 A1 | 6/2006 | Redi | |
| 2006/0215583 A1 | 9/2006 | Castagnoli | |
| 2006/0227724 A1 | 10/2006 | Thubert et al. | |
| 2006/0229083 A1 | 10/2006 | Redi | |
| 2007/0070983 A1* | 3/2007 | Redi et al. | 370/352 |
| 2007/0110000 A1 | 5/2007 | Abedi | |
| 2007/0149204 A1 | 6/2007 | Redi et al. | |
| 2007/0153731 A1 | 7/2007 | Fine | |
| 2008/0049620 A1 | 2/2008 | Riga et al. | |
| 2008/0232258 A1* | 9/2008 | Larsson et al. | 370/238 |
| 2008/0232344 A1 | 9/2008 | Basu et al. | |
| 2009/0103461 A1* | 4/2009 | Tan et al. | 370/310 |
| 2009/0161641 A1 | 6/2009 | Kim | |

OTHER PUBLICATIONS

Office Action dated Jan. 7, 2011 U.S. Appl. No. 11/656,767.

Chlamtac et al, "An Energy-Conserving Access Protocol for Wireless Communication," IEE Int. Conf. On Comm. (ICC-97), pp. 1059-1062 (1-4), Montreal, Jun. 1997.

Clausen, et al, "Optimized Link State Routing Protocol (OLSR)," Technical Memo, RFC 3626, The Internet Society, pp. 1-6 (2003).

Dai H. et al: "Tsync: A Lightweight Bidirectional Time Synchronization Service for Wireless Sensor Networks" (Jan. 2004), Mobile Computing and Communications Review, ACM, NY, pp. 125-139, ISSN: 1091-1669.

Darabi et al, "An Ultra Low Power 900 MHz CMOS Receiver for Wireless Paging," University of California, Los Angeles, pp. 1-33 (1998).

Ebner et al: "Decentralized slot synchronization in highly dynamic ad hoc networks" Wireless Personal Mutlimedia Communications, 2002, IEEE, vol. 2, (Oct. 27, 2002).

Ebner et al, "Synchronization in Ad Hoc Networks Based on UTRA TDD" 5 pages (2003).

Elson et al., "Fine-Grained Network Time Synchronization using Reference Broadcasts," Proc. USENIX OSDI, pp. 147-163 (2002).

Florens, C. et al. "Scheduling Algorithms for Wireless Ad-Hoc Sensor Networks", Global Telecommunications Conference, 2002. GLOBECOM '02 IEEE. vol. 1., pp. 6-10 (2002).

Halvardsson et al, "Reliable Group Communication in a Military Mobile Ad Hoc Network," Vaxjo University School of Mathematics and Systems Engineering, Report # 04006, pp. 1-52 (2004).

Hong et al, "Scalable Routing Protocols for Mobile Ad Hoc Networks," IEEE Network; Jul./Aug. 20002; pp. 11-21.

Huang, Z. et al., "A Busy-Tone Based Directional MAC Protocol for Ad Hoc Networks", MILCOM 2002. Proceedings. IEEE, vol. 2. pp. 1233-1238 (2002).

Huang, Z. et al., "A Comparison Study of Omnidirectional and Directional MAC Protocols for Ad Hoc Networks". Global Telecommunications Conference, GLOBECOM '02. IEEE, vol. 1, p. 57-61 (2002).

Ko, Y. B. et al., "Medium Access Control Protocols Using Directional Antennas in Ad Hoc Networks", INFOCOM 19th Annual Joint Conference of the IEEE Computer and Communications Societies, IEEE, vol. 1:13-21 (2000).

Lang, "A Comprehensive Overview about Selected Ad Hoc Networking Routing Protocols," pp. 1-59 (2003).

Liu et al, "A Bluetooth Scatternet-Route Structure for Multihop Ad Hoc Networks," IEEE Journal on Selected Areas in Communications, 21:2, pp. 229-239 (2003).

Liu et al, "Simulation Modeling of Large-Scale Ad-hoc Sensor Networks," European Simulation Interoperability Workshop, Univ. of Westminster, London; 12 pages, Jun. 25-27.

Mauve, M. et al. A Survey on Position-Based Routing in Mobile Ad Hoc Networks. Network, IEEE. 15:6, 30-39 (2001).

Mills, "Internet Time Synchronization: The Network Time Protocol," IEEE Transactions on Communications, 39:10; pp. 1482-1492 (1991).

Nasipuri, A. et al. A MAC Protocol for Mobile Ad Hoc Networks Using Directional Antennas. Wireless Communications and Networking Conference 2000. WCNC. 2000 IEEE, 3:1214-19. (2000).

Ogier et al, "Topology Dissemination Based on Reverse-Path Forwarding (TBRPF)," Sunsite.dk, Technical Memo, RFC 3684, The lntrnet Society, pp. 1-49 (2004).

Ruppe et al, "Near Term Digital Radio (NTDR) System," IEEE, pp. 1282-1287 (1997).

Salkintzis et al: "Performance Analysis of a Downlink MAC Protocol with Power-Saving Support", IEEE Trans. On Vehicular Tech., vol. 49, No. 3 pp. 1029-1040 (2000).

Shang, Z. et al: "A low overhead multi-hop time sync protocol for wireless sensor networks" Networking, Sensing and Control, 2005, IEEE (Mar. 19, 2005), pp. 54-59.

Sichitiu et al, "Simple, Accurate Time Synchronization for Wireless Sensor Networks," Proc. IEEE, WCNC, pp. 1266-1273 (2003).

Singh S. et al "Power-Aware Routing in Mobile Ad Hoc Networks" Mobicom '98, Proceedings of the 4th Annual ACM/IEEE International Conference on Mobile Computing and Networking, Dallas, TX (Oct. 25-30, 1998) XP000850267, pp. 181-190.

Tjoa R. et al: "Clock drift reduction for relative time slot TDMA-based sensor networks" (Sep. 5, 2004) PIMRC 2004, IEEE, pp. 1042-1047.

Warneke, "Ultra-Low Power Circuits for Distributed Sensor Networks (Smart Dust)," UC Berkeley, pp. 1-3 (2003).

Werner-Allen et al, "Firefly-Inspired Sensor Network Synchronicity with Realistic Radio Effects," Proc. ACM Sensys, pp. 142-153 (2005).

Wieselthier et al, "On the Construction of Energy-Efficient Broadcast and Multicast Trees in Wireless Networks," IEE Infocom, pp. 585-594 (2000).

Ye F. et al "A randomized energy-conservation protocol for resilient sensor networks" Wireless Networks; The Journal of Mobile Communication, Computation and Information, Kluwer Academic Publishers, DOI, vol. 12, No. 5, (Apr. 27, 2006) pp. 637-652.

Office Action dated Sep. 8, 2006, U.S. Appl. No. 10/786,288.
Office Action dated Mar. 30, 2007, U.S. Appl. No. 10/786,288.
Office Action dated Sep. 25, 2007, U.S. Appl. No. 10/786,288.
Office Action dated Jun. 15, 2007, U.S. Appl. No. 10/677,945.
Office Action dated May 7, 2007, U.S. Appl. No. 11/078,257.
Office Action dated Dec. 12, 2007, U.S. Appl. No. 10/677,945.
Office Action dated Apr. 3, 2008, U.S. Appl. No. 10/786,288.
Office Action dated Dec. 10, 2008, U.S. Appl. No. 11/439,320.
Office Action dated Dec. 9, 2008, U.S. Appl. No. 11/347,963.
Office Action dated Aug. 26, 2009, U.S. Appl. No. 11/439,320.
Office Action dated Sep. 16, 2009, U.S. Appl. No. 11/347,963.
Office Action dated Dec. 23, 2009, U.S. Appl. No. 11/439,320.
Office Action dated Jul. 2, 2010, U.S. Appl. No. 11/895,527.
Office Action dated Jul. 7, 2010, U.S. Appl. No. 11/439,320.
Office Action dated Jul. 20, 2010, U.S. Appl. No. 11/656,767.
Office Action dated Aug. 3, 2010, U.S. Appl. No. 11/895,608.

* cited by examiner

SYSTEMS AND METHODS FOR ADAPTIVE ROUTING IN MOBILE AD-HOC NETWORKS AND DISRUPTION TOLERANT NETWORKS

CROSS-REFERENCE TO RELATED PATENT APPLICATIONS

This application claims the benefit of and priority to U.S. Provisional Patent Application No. 60/965,573, filed Aug. 20, 2007, the entire contents of which are incorporated herein by reference.

GOVERNMENT CONTRACTS

The U.S. Government has a paid-up license in this invention and the right in limited circumstances to require the patent owner to license others on reasonable terms as provided for by the terms of Contract No. W15P7T-06-C-P638, awarded by the Defense Advanced Research Projects Agency.

FIELD OF THE INVENTION

The present invention generally relates to communications networks and, more particularly, to mobile ad-hoc and disruption tolerant networks.

BACKGROUND

A mobile ad-hoc network (MANET) is a wireless network comprised of two or more mobile routers and/or hosts, also known as nodes. Since the nodes are mobile, the network topology can change quite often. Nonetheless, in an ideal ad-hoc network there is almost always connectivity between any two nodes in the network, that is, there is always a path between any two nodes in the network such that information can be transmitted between the two nodes. A disruption/delay tolerant network (DTN) may include a mobile ad-hoc network in which at a particular point in time a path between two nodes may not exist, making the routing of information through the network quite challenging.

The routing problem in a DTN is challenging in several respects. First, as mentioned above, unlike in MANETs, there may never be a contemporaneous end-to-end path from a source to destination and one has to exploit transient contacts between nodes in the network to deliver a data packet. Conventional MANET routing protocols typically fail to deliver packets in such situations. Second, disconnection is often the norm rather than the exception, and therefore, controlled replication of data packets becomes much more important. Third, managing persistent storage and bandwidth-limited ephemeral contacts between the nodes in the network is an integral part of the routing in DTNs.

Real-life networks are seldom purely MANETs or DTNs. They often exhibit varying levels of stability and disruption, in terms of data packet delivery, over space and time. Thus, it is important for a routing process to adapt to the network topology and characteristics, and provide robust performance in terms of the required reliable delivery of data packets. Although several routing processes for DTNs exist, such as epidemic routing, probabilistic forwarding and purging, and future contact prediction, there is a need for a routing process which is simple, reliable, independent of the contacts between the nodes in the network, and capable of application in both DTNs and MANETs.

SUMMARY

The invention, in various embodiments, addresses deficiencies in the prior art by providing systems, methods and devices that enable a communications network, via one or more nodes, to efficiently deliver information from a source to a destination under dynamic topology conditions, intermittent topology conditions, or when certain communications links are susceptible to disruption.

The systems and methods described herein include adaptive routing processes for packet-based wireless communication networks, such as DTNs and/MANETs. This routing approach works both in MANETs (when a contemporaneous end-to-end path is available) and in DTNs (when a contemporaneous end to end path is not available, but a path is formed over space and time). In particular, the systems and methods include adaptively selecting a routing process for such wireless communication networks for transmitting a packet through a node in the network based on available information on the network topology and/or the contents of the packet. In one configuration, this adaptive approach employs an Anxiety Prone Link State (APLS) mechanism.

In one aspect, when a node in the network receives a packet, the node queues the packet for transmission based on the delay, bandwidth, and an availability measure of the nodes and/or links in the network. In one implementation, for example, the availability measure is a metric of average availability. The node compares a routing parameter computed using this routing information to a threshold. In one implementation, the threshold is determined based on the required reliability for transmitting packets through the network. In a further implementation, the threshold is based on the contents of the packet. For example, if the packet comprises Voice-over-internet protocol (VoIP) data, lower reliability is required than if the packet comprises file-transfer-protocol (FTP) data. Therefore, the threshold for VoIP data would be markedly different than for FTP data. Based on the results of the routing parameter comparison, the packet is either queued for transmission to a single neighboring node in the network using, for example, a shortest-path routing process, or it is queued for transmission to all neighboring nodes using an epidemic routing process. In the case of the epidemic routing process, one could use, for example, a prioritized epidemic routing process. In a further implementation, if the network availability and/or the composition of these two queues change, packets could be moved between the two queues. For example, a packet initially queued for shortest-path routing may be transferred to the epidemic routing queue if the connectivity between the node and its intended next hop node becomes less reliable.

In one implementation, routing and packet control information, for example in the form of a link state advertisement (LSA) or similar message, is disseminated in the network using an epidemic routing process at periodic intervals in time. In an alternative implementation, routing and packet control information is disseminated in the network as soon as it arrives at a node using, for example, a flooding routing process. If there is a failure of any recipient node to receive a message via flooding, the message can be transmitted to the recipient node at the next scheduled epidemic transmission time.

In another aspect, an adaptive router in a communications network includes a receiver that receives a data bundle where the data bundle originates from a source node and has a designated destination node. The router also includes a processor that i) determines the routing cost associated with delivering the data bundle from the router to the destination node, ii) compares the routing cost with a threshold value, and iii) if the routing cost is greater than or equal to the threshold value, then further processes the data bundle based on a first routing mechanism or, if the routing cost is less than the threshold value, then further processes the data bundle based on a second routing mechanism.

In one configuration, the receiver receives topology awareness information from one or more other nodes in the communications network. The topology awareness information may include link availability information associated with one or more communications links between a plurality of nodes of the communications network. The routing cost may be based, at least in part, on the availability information. The threshold may be predetermined or dynamically set. The first routing mechanism may include prioritized epidemic routing while the second routing mechanism may include a shortest path cost mode. Thus, in disrupted regions or at disrupted times, replicated forwarding of data bundles (similar to PREP forwarding) may be employed while at stable times or regions, the router may perform conventional MANET forwarding (e.g., single copy sent over shortest cost path).

BRIEF DESCRIPTION OF THE DRAWINGS

These and other features and advantages will be more fully understood by the following illustrative description with reference to the appended drawings, in which like elements are labeled with like reference designations and which may not be drawn to scale.

DETAILED DESCRIPTION OF ILLUSTRATIVE EMBODIMENTS

Figure 1:
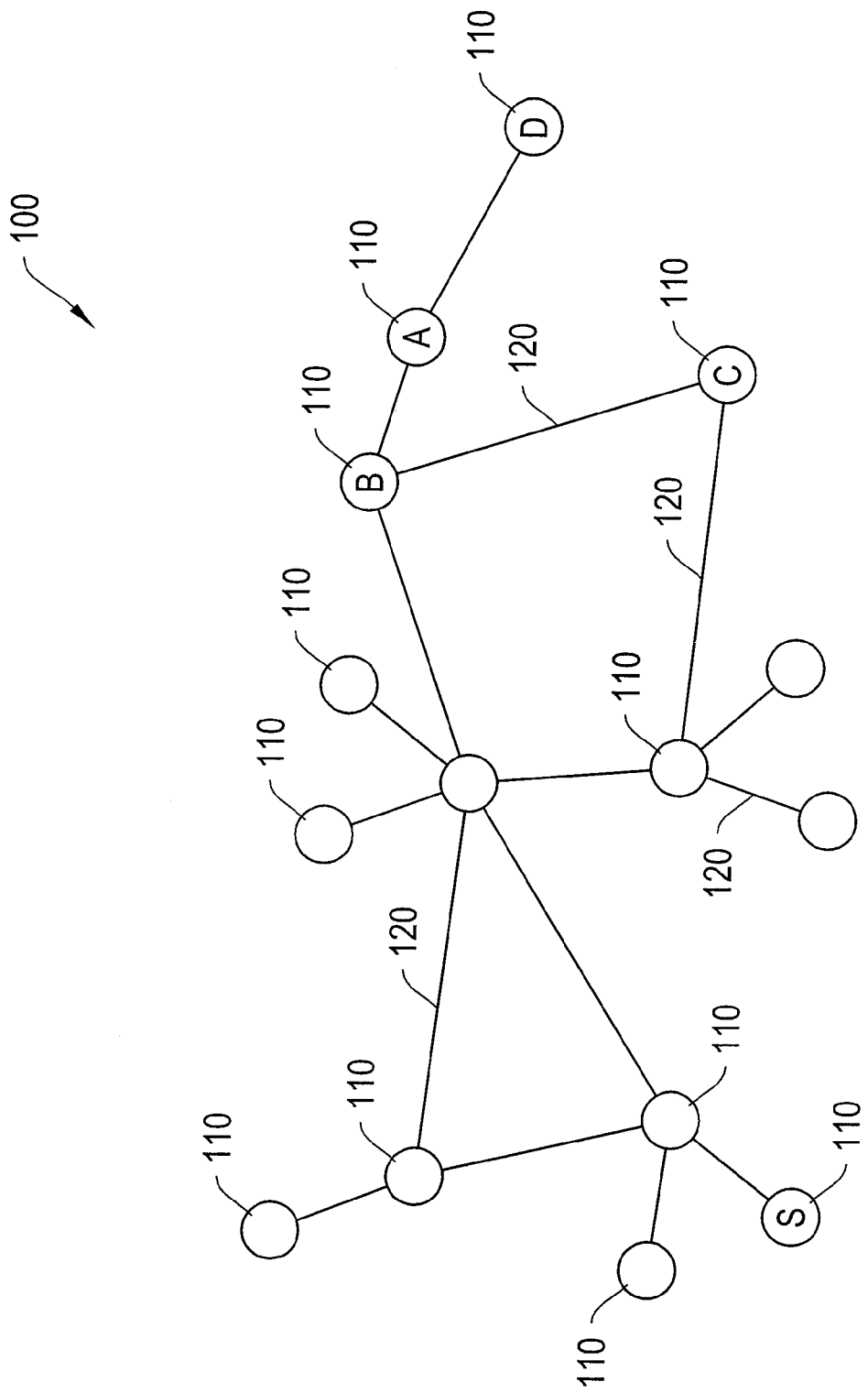
FIG. 1 is a diagram illustrating an exemplary communications network including multiple communication nodes according to an illustrative embodiment of the invention.

FIG. 1 is a diagram illustrating an exemplary communications network 100 including multiple communication nodes 110 according to an illustrative embodiment of the invention. In one embodiment, the network 100 employs various communication nodes 110. The nodes 110 may be interconnected by one or more communication links 120. The communication links 120 may, but need not be limited to, wireless communication links. The nodes 110 that share a communication link 120 may be referred to as "neighbors." Although the network 100 is shown having certain connectivity, the network 100 may be more sparsely connected (e.g., each node 110 may be connected by a communication link 120 to only one or two other nodes 110) or more completely connected (e.g., each node 110 may be connected by communication links 120 to most or all other nodes 110). Certain nodes may spend a significant amount of time in a disconnected state as well and not just be sparsely connected.

For the purpose of later discussion, a node 110 is labeled node S to indicate that the node S is the originator or source of a data packet or packets (or data bundles). Another node 110 is labeled node D to indicate that the node D is the intended destination node of the data packet or packets originating from the node S. At certain times, certain nodes 110 may be linked via links 120 to other nodes 110. However, at other times, certain nodes 110 may not be linked with, or disrupted from connecting with other nodes 110 via the links 120. For example, if the network 100 operates as a mobile ad-hoc network, then certain nodes 110 may link with other nodes 110 when environmental and/or radio frequency conditions enable such linking.

Figure 2:
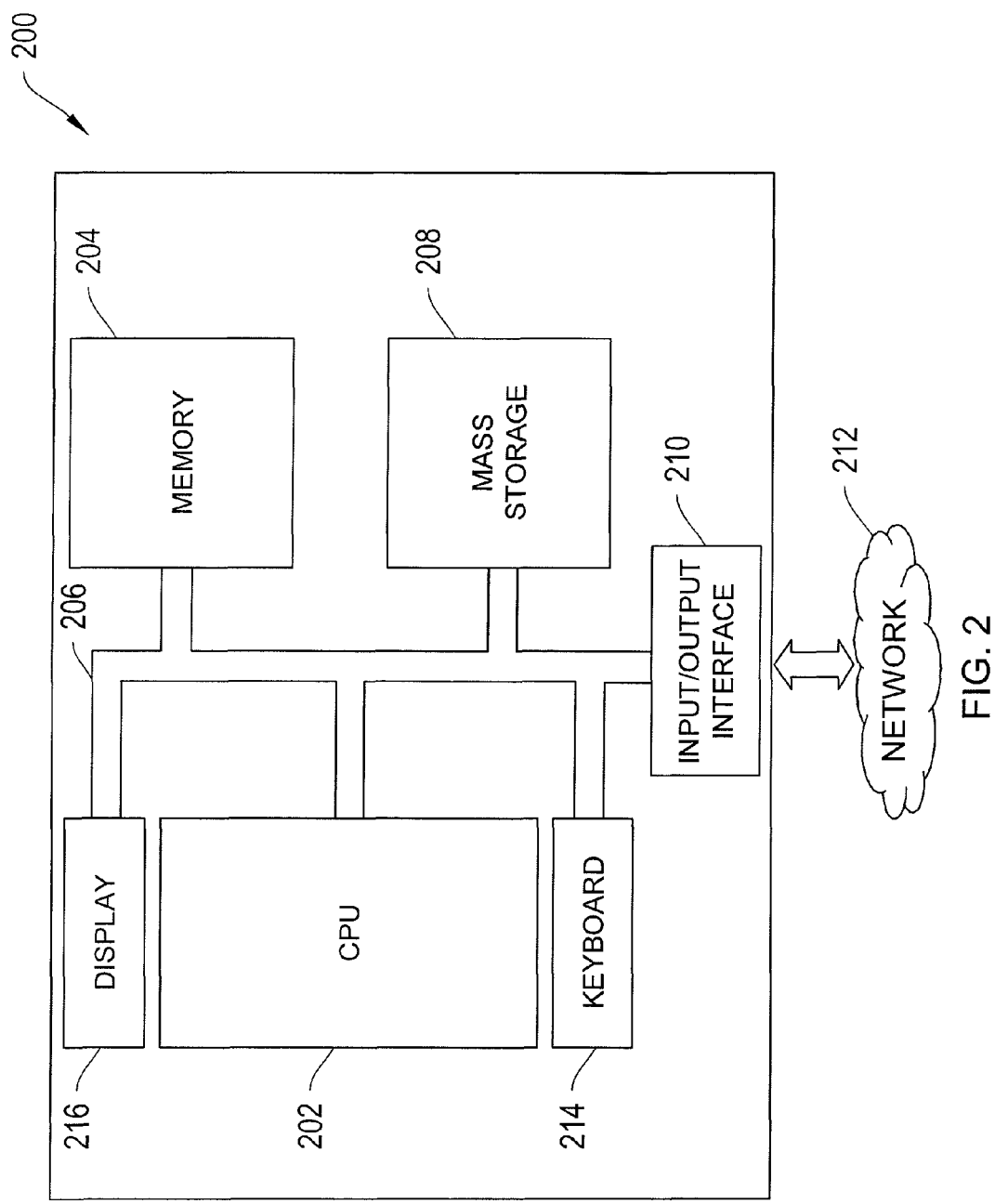
FIG. 2 shows a functional block diagram of general purpose computer and/or communications system for performing the functions of a network node according to an illustrative embodiment of the invention.

FIG. 2 shows a functional block diagram of general purpose computer and/or communications system 200 for performing the functions of a network node 110 according to an illustrative embodiment of the invention. The exemplary computer system 200 includes a central processing unit (CPU) 202, a memory 204, and an interconnect bus 206. The CPU 202 may include a single microprocessor or a plurality of microprocessors for configuring computer system 200 as a multi-processor system. The memory 204 illustratively includes a main memory and a read only memory. The computer 200 also includes the mass storage device 208 having, for example, various disk drives, tape drives, etc. The main memory 204 also includes dynamic random access memory (DRAM) and high-speed cache memory. In operation, the main memory 204 stores at least portions of instructions and data for execution by the CPU 202.

The mass storage 208 may include one or more magnetic disk or tape drives or optical disk drives or flash drives, for storing data and instructions for use by the CPU 202. At least one component of the mass storage system 208, preferably in the form of a disk drive or tape drive, stores the database used for enabling the processing and routing of data packets, including sending and receiving, in the communications network 100 of the invention. The mass storage system 208 may also include one or more drives for various portable media, such as a floppy disk, a compact disc read only memory (CD-ROM), flash, or an integrated circuit non-volatile memory adapter (i.e. PC-MCIA adapter) to input and output data and code to and from the computer system 200. Another form of storage 208 may include a USB stick that can store DTN bundles and can be moved to another computer and/or device to enable transferring the bundles. In one embodiment, a USB stick functions as a DTN communications link.

The computer system 200 may also include one or more input/output interfaces for communications, shown by way of example, as interface 210 for data communications via the network 212. The data interface 210 may be a modem, wireless transceiver, an Ethernet card or any other suitable data communications device. To provide the functions of a node 110 according to FIG. 1, the data interface 210 may provide a relatively high-speed link to a network 212, such as an intranet, internet, or the Internet, either directly or through an another external interface 116. The network 212 may include one or more network nodes 110. The communication link to the network 212 may be, for example, optical, wired, or wireless (e.g., via satellite or cellular network). Alternatively, the computer system 200 may include a mainframe or other type of host computer system capable of Web-based communications via the network 212.

The computer system 200 may also include suitable input/output ports or use the interconnect bus 206 for interconnection with a local display 216 and keyboard 214 or the like serving as a local user interface for programming and/or data retrieval purposes. Alternatively, server operations personnel may interact with the system 200 for controlling and/or programming the system from remote terminal devices via the network 212. In certain embodiments, the computer system may operate without a display 216 and keyboard 214, or without other elements, depending on the purpose to the system 200.

The computer system 200 may run a variety of application programs and store associated data in a database of mass storage system 208. One or more such applications may enable the receipt and delivery of messages to enable operation as a server or router, for implementing router functions relating to routing data packets within the network 100 of FIG. 1. In certain embodiments, the computer system 200 may by includes a network node which may include, without limitation, a router, wireless router, wireless computing device, personal media device, personal data assistant, cellular telephone, embedded devices, sensor nodes, or any like device capable of data communications. The components contained in the computer system 200 are those typically found in general purpose computer systems used as servers, workstations, personal computers, network terminals, wireless communications devices, and the like. In fact, these components are intended to represent a broad category of such computer components that are well known in the art. Certain aspects of the invention may relate to the software elements, such as the executable code and databases for the nodes 110 of the network 100.

Figure 3:
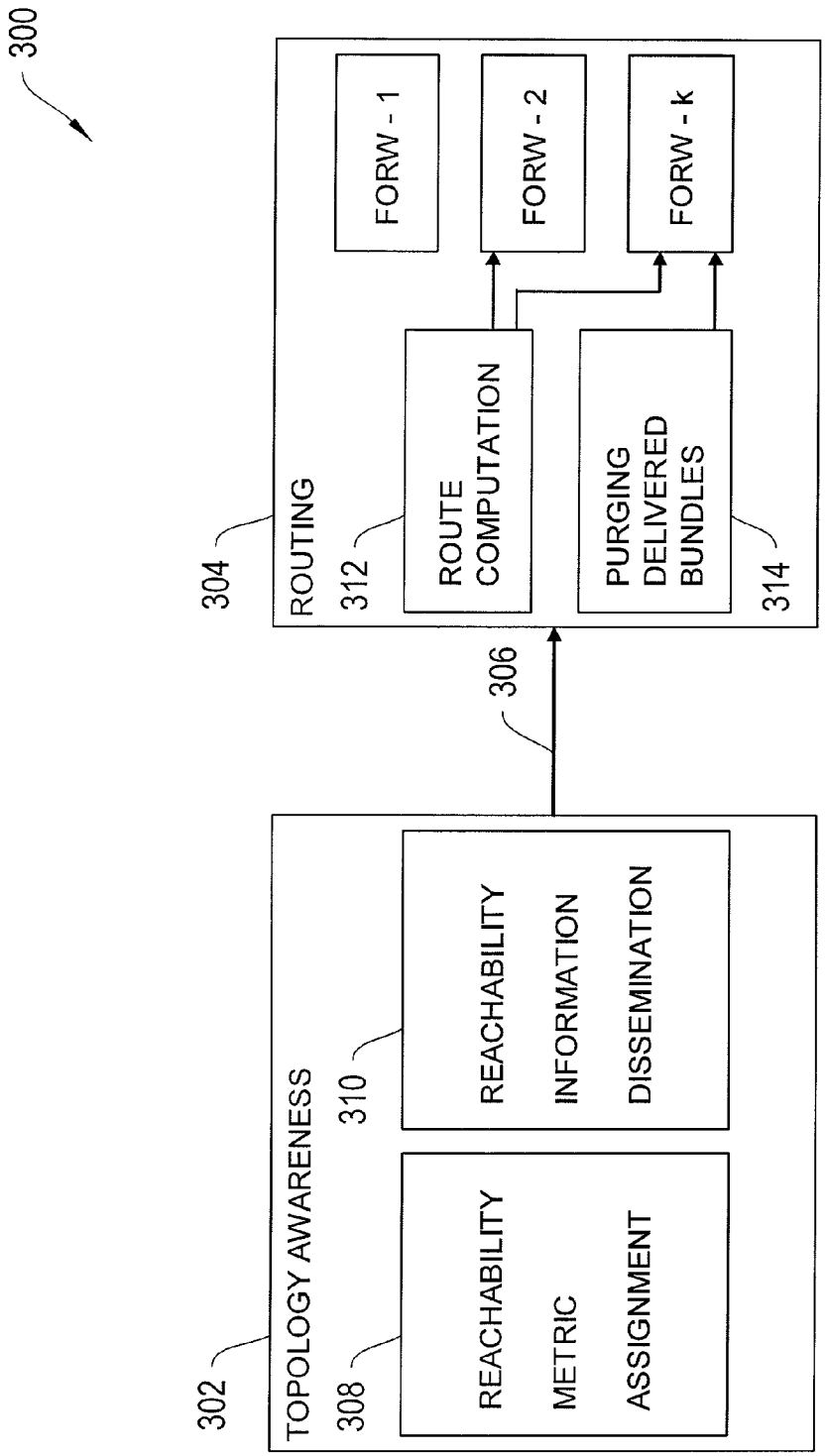
FIG. 3 is a diagram of a computer processing environment including functions, applications and/or routines running within a network node according to an illustrative embodiment of the invention.

FIG. 3 is a diagram of a computer processing environment 300 including functions, applications and/or routines running within a network node 110 according to an illustrative embodiment of the invention. In certain embodiments, one or more nodes 110 support a routing architecture to affect the delivery of data bundles and/or packets from a source node S to a destination node D. In one embodiment, the routing process is handled using two functions, modules, processes, and/or applications. The first module 302 includes topology awareness, whose goal is to make nodes 110 aware of the network 100 connectivity. The second function 304 includes route determination and forwarding (together called referred to as routing), whose goal is to compute routes, based, in some instances, on topology awareness, and forward bundles along that, route. In certain embodiments, one or more nodes 110 include functions 302 and 304 that support a DTN routing system within the network 100. An arrow 306 from the function 302 toward the function 304 indicates that function 304, in at least one embodiment, uses results from function 302. The forwarding function 304 may use other functions and/or other information sources to enable routing of data bundles and/or packets. The terms module and function may refers to software, hardware, or a combination thereof that perform certain operations.

Each of the topology awareness function 302 and routing function 304 may include subroutines, functions, sub-modules, and/or components, which may be built upon modular, reusable mechanisms such as the routing 304 shown in FIG. 3. A highly modular and parameterized epidemic routing function may be used for a number of purposes including, without limitation, adaptive dissemination of routing information, distribution of messages that purge excess copies of a bundle, and epidemic routing of data bundles. The topology awareness module 302 may include a reachability (link) metric assignment module 308 and reachability information dissemination module 310. The routing module 304 may include a route computation module 312 and a purging delivered bundles module 314. Any one or combination of these modules may form DTN routing utilities. These utilities may be called upon by a node 110 and combined in different ways to produce actual routing/forwarding mechanisms.

In certain embodiments, the forwarding modules include functions supporting algorithms that decide how to forward a bundle using the information available. Examples of forwarding techniques include, without limitation, Gossip, Epidemic, conventional shortest path first (SPF) forwarding, and the like. The extent to which the forwarding modules use the topology awareness, and other sub-modules may vary. For example, Gossip may not use other sub-modules. Epidemic techniques may take advantage of purging and SPF.

In one embodiment, the routing module 304 relies on and/or uses topology awareness provided by the topology awareness module 302. There are at least two forwarding mechanisms called Prioritized Epidemic (PREP) and Anxiety Prone Link State (APLS), both of which may use all of the sub-modules, but in different ways to enable enhanced DTN routing.

Topology awareness and routing are features of a bundle and/or packet forwarding mechanism described in more detail later herein. In one aspect, the forwarding mechanism can provide a "baseline" solution that can serve as a comparison point for sophisticated DTN routing techniques. In certain instances, the baseline emphasizes simplicity of operation, ease of implementation and robust dynamics over performance and scalability. In other embodiments, the forwarding mechanisms include more than trivial solutions such as, for example, Gossip.

The topology awareness function and/or module 302 may include at least two sets of functions: calculating the metrics on links via module 308 and disseminating information via module 310 so that all nodes are aware of the topology. For link metrics, an additional DTN-tailored metric delay, referred to as Average Availability (AA), may be added to the conventional delay and bandwidth metrics. The dissemination may be based on a variant of epidemic routing, referred to as Epidemically Synchronized Topology (EST). The particular combination of the two, which may be used as a baseline, is referred to as ESTAA. The metric assignment and dissemination may be adjusted and/or changed independent of each other.

Because this may be considered a baseline, certain embodiments prioritize more on getting the nodes to have as best a view of the network 100 topology as possible rather than containing overhead in doing so. Such embodiments, however, may include mechanisms to limit overhead.

There may be at least five types of links in a DTN protocol specification including: static, or "always-on", on-demand, for instance, dialup or by launching a data mule, discovered, scheduled, and predicted. There may be at least three metrics attached to each link: delay, data rate, and average availability (AA). The delay and data rate metrics may be configured for each link when possible or left unknown. Some link types, such as scheduled links, may have additional information (e.g. the availability schedule).

In one embodiment, the average availability (AA) metric attempts to measure the time averaged fraction of the link capacity available for use. AA may be unitless, but may be multiplied by the data rate to determine the average data transporting capability for route computation purposes. This may depend on the preference of the route computation module. In one embodiment, AA is calculated as follows.

Static links: It is assumed that static links are always available. Thus, $AA_{st}=1$ On Demand links: It is assumed that on-demand links are always available, modulo the correct working of the mechanism to "open" such links on demand. Thus, $AA_{od}=1$.

Discovered links: Let $T_i=\min(T_a, T_m)$ where $T_a$ is the time in the most recent past for which up/down information is available and $T_m$ is a configured "max window" time. Let $T_{up}$ be the total time within $T_i$ that the link was "up", that is, peers could communicate with some adequate quality. Then, the average availability for discovered links is defined as $AA_{ds}=T_{up}/T_i$. If the link has been down for more than a configured $T_g$ seconds ($T_g$ could be same as $T_m$), the link is "forgotten". If and when the link appears again, it is considered a "new" link and therefore $T_a$ is set to the amount of time that the link has been up (this is the most recent past since the old past has been forgotten). This will make the AA jump to nearly one immediately. If $T_a$ is not used, then the window is a constant and a link reappearing for a short time will get a low AA and, hence, may not get packets routed to it before it disappears. An alternative design would be to use an exponential moving average.

Scheduled links: The information for scheduled links may include at least two parts: 1) Activation Schedule including the future times and durations that the link will be available. This may be specified in a TLV (type, length, value) format. Currently; we have only one type; namely PERIODIC. The value field for this may include: next-Time, interActivationPeriod, and/or activationDuration; 2) Average Availability. For as long a time $T_s$ in the future that information is available, if $T_{up}$ the total time within that that the link is scheduled to be up rather than down, then $AAS_{sc}=T_{up}/T_s$. A route computation module may use either or both parts to select routes. If the routing algorithm is capable of handling schedule information, it could use the activation schedule information. Otherwise, it might use the abstract AA information.

Predicted links: In some embodiments, this version of topology awareness does not support predicted links.

Certain embodiments employ Epidemically Synchronized Topology (EST) for topology information dissemination. EST focuses more on complete and robust dissemination of topology and less on adaptability or performance. The goal is for all nodes 110 to have as complete a knowledge of the topology as possible within a short time. In one embodiment, containment of dissemination overhead is not a priority of EST. The basic idea behind EST is to epidemically exchange link-state information so that every change is maximally conveyed to every node 110 in the network 100. In particular, partition healing will cause every node 110 in each partition to know the full (healed) topology immediately (i.e., without waiting for periodic updates to happen).

The basic unit of information may include a Link-State Advertisement (LSA). An LSA may include an originator effective traveled distance (ETD), a set of links (with metrics, if applicable) at that originator, and a sequence number unique to that originator so that the (origEID, sequence-number) tuple is unique across the network 100. All links 120 are assumed to be bidirectional and/or symmetric. A sensor/MANET DTN may include multiple unidirectional links due to power asymmetry which may or may not be accounted for in a baseline. An LSA may include any of on-demand, discovered, or scheduled links. In case of a scheduled link, the (possibly encoded) schedule may be attached to the details of the LSA. In one embodiment, the union of all LSAs captures the network topology (in a redundant manner). A subset of those LSAs captures the graph induced by the originators of the LSAs in this subset.

A unit of operation may include a "topology synchronization" or "sync". A sync between two nodes A, B, denoted sync(A, B), represents a (minimal) exchange of LSAs such that the topology awareness of A is identical to that of B. Thus, after a successful sync, A and B have LSAs from the same set of originators, and for each originator, the sequence number of the LSA from that originator is the same in nodes A and B.

By way of another example, consider a node Q. A topology sync between Q and another available peer X may be executed whenever one of the following conditions is true:

1) When a metric m of a link from Q to any of its peers increases or decreases by $J_m$ percent or more. This by definition subsumes the case when a link comes up or goes down. Even if only a subset of the links have changes, all of the links may be included in the LSA. This decision may be based on the original ARPANET link-state operations where sending only the changed subset may work. Because there may be limited confidence in this approach, the safe version of including all links in the LSA is employed.

2) When a sync was recently executed with another node (not X).

3) When it is not the case that a sync was executed between Q and X in the last $T_{lb}$ seconds (lower bound). This prevents continuous chain reaction in the same node due to condition 2.

4) When no sync has been executed with X for the last $T_{sp}$ (sp=sync period) seconds. This is the periodic refresh.

A sync between nodes A and B may operate in the same manner as in epidemic routing. In one embodiment, summary vectors are first exchanged that list the set of (originator, seq-no) LSAs known by each node A and B. DTN endpoints, nodes, and/or applications may be identified by endpoint identifiers (EIDs) which may include a URI-style format. The lower EID node (say A without loss of generality) then sends the LSAs that contain an originator that B did not report. Next, A sends those LSAs that do have the same originator, but with a higher sequence number (seq-no) than B reported for that originator. After this, A sends an initiation message (e.g., a "now you" message) and B does vice versa. After a successful sync, both A and B have an identical set of LSAs and therefore the same knowledge of the topology. A sync may execute without any LSAs going across a link 120. A total ordering, perhaps lexicographic-based, may be available for EIDs which is dependent upon the EID structure (for the simulations, e.g., an integer).

The sync process, as described above, may include flooding of a link-state advertisement upon a state change. Suppose that G is a connected network and all nodes have converged to have G in their database. Suppose a link z between A and B goes down. Then, both A and B have G-z whereas all other nodes have G. Consider, without loss of generality, node A and any of its neighbors $N_i$. By condition and/or rule (1) above, a sync may be triggered between node A and node $N_i$. Now, $N_i$ sees G-z as well. The LSA originated at node A is sent from node A to $N_i$. Considering, for example, neighbors $N_{ij}$ of each node $N_i$, by condition and/or rule (2), a sync is executed between $N_{ij}$ and all $N_i$, and the only difference is that the LSA(A) which is sent from $N_i$ to $N_{ij}$. Thus, LSA(A) starts out at node A and is "flooded" throughout the network, which is the behavior of link state flooding.

EST can go beyond conventional link-state routing. Specifically, knowledge of links 120, whose change was disseminated prior to a particular event, but is not part of the knowledge of a node 110, is updated to the node 110 immediately. For example, when two partitions are joined, each node in each partition learns the entire current connected topology due to rules (1) and (3) above. This does not happen in traditional link state routing. This feature is very valuable in disruption-prone and/or DTN networks. However, it could create an overhead-intensive issues.

The sync messages in EST may compete with bundles for the link 120 bandwidth. Thus, a relative priority may be assigned. EST leaves this to the particular protocol. That is, a forwarding algorithm can decide whether it wants to give more priority to EST messages or less. For instance, if the algorithm relies heavily on topology awareness, it might give EST messages higher priority than bundles, otherwise not. In the next section, we describe two algorithms, one of which prioritizes EST messages higher and one lower. The dissemination feature of function 310 may be turned off based on a configuration parameter, resulting in no topology awareness.

The routing function and/or module 304 may include features for deciding how to handle a just-received bundle. Possible actions may include: deleting the bundle, forwarding the bundle to a specific peer endpoint, forwarding a copy of the bundle to a specific peer endpoint, initiating a purge, or doing nothing. This may or may not involve utilizing the topology awareness obtained from module 302. The routing function and/or module 304 may include sub components: Route Computation module 312 for determining metric-biased shortest paths; Purging module 314 for ridding a node's buffers of bundles that have been successfully delivered; and a Forwarding module for managing the forwarding/replication/discarding, and perhaps, coding of bundles.

The forwarding function and/or module may include at least one of two protocols: Prioritized Epidemic (PREP) and Anxiety Prone Link State (APLS). These protocols may use either or both the route computation and purging mechanisms of modules 312 and 314, which are described as follows along with descriptions of PREP and APLS.

In certain embodiments, as a result of EST, each node has a best-effort view of the network 100 topology. This can be thought of as a weighted graph, with three weights on the edges, namely AA, delay and data rate. If the edge represents a scheduled link, an activation schedule is included. The objective of route computation for a baseline may include the following: given a source node S EID and a destination node D EID, determine the "minimum cost path" from node S to node D.

Route computation may address at least two issues: 1) determining what the "cost function" is and 2) generating an associated the path and/or route for a bundle. For the cost function, in one embodiment, the AA is used as the primary discriminator, breaking ties using the delay, and ignoring the data rate. This approach may be chosen primarily for its simplicity. For route generation, a variant of Dijkstra's shortest path algorithm may be employed that uses delays to break ties and also prune out paths whose delays are such that they exceed the expiry time. This may be done by accumulating the path delays during the Dijkstra tree expansion. At any point in the expansion, there is a delay label (in addition to the primary cost label, explained below) that includes the link delays and the waiting times at nodes 110 if the links are scheduled. Currently non-existent but scheduled to-appear links may show up as edges in the graph tagged with the activation schedule or equivalent thereof. The algorithm may traverse those edges as though they were existing node, accumulating the progressive schedule.

In one embodiment, a forwarding process may include routing and including in the delay the waiting time at each node 110. Only those paths that have a delay less than the time-to-expire are expanded further. In the most common version of Dijkstra, the edge weights are typically additive and the algorithm biases toward lower path/edge weights. While the delay may metric fit that approach, the AA metric may not. Thus, embodiments include two alternatives: 1) convert the AA metric into a "cost" so that higher cost means worse link and are additive or 2) modify Dijkstra and use, for example, a generalized Dijkstra model.

In certain embodiments, route computation of module 312 may include at least one of the following cost functions:

Linear: $\text{cost}=(1-AA)+C$ (where $C=0.01$)

Exponential: $\text{cost}=2^{(10(1-AA))}$

C may be adjusted and includes a small constant factor that enables the routing process to favor fewer numbers of hops when all links have an AA=1. The linear function may penalize lower availabilities the same as higher availabilities which may not be optimal for all conditions. For example, a single-hop path of 0.15 availability will be preferred to a 3-hop path of 0.7 availability, whereas it may be intuitively more comfortable to choose the 3-hop path.

With the exponential function, the cost increases exponentially with decreasing AA. For AA (1, 0.9, 0.8, . . . ) cost is (1, 2, 4, 8, 16, . . . ). In the above case, the cost of the single-hop AA=0.1 path is 362 whereas the cost of the 3-hop AA=0.7 path is 8, which is preferred. In one embodiment, the cost function may include a combination of linear and exponential functions.

The cost of a scheduled link 120 when used with an activation schedule may be based on an AA=0.95, which is slightly less than a static/on-demand link. This accounts for the risk that a scheduled link 120 may not show up, and thus, if there are equal hop scheduled and static links, routing will prefer to use the static links purely on a cost function basis. The route computation procedure may take into account scheduled links 120 using an modification where a scheduled link that is not up right now is taken into account for the route computation by accommodating the waiting time at each node as part of the overall delay. On-demand links 120 may be treated just like always-on links 120. In one embodiment, a fail-safe procedure opens an on-demand link when required.

Other embodiments may consider the data rate of a link 120 in the availability calculation and keep (and have the routing algorithm treat) AA's for each kind of link separately. Combinations of cost functions may include: multiplicative Dijkstra with direct AAs, additive Dijkstra with linear derived cost, additive Dijkstra with exponential derived cost.

Certain DTN routing protocols that use replication with storage are likely to have, in their node buffers, bundles that have been delivered, but not expired. Instead of waiting for the bundle lifetime to expire, a purging mechanism may actively identify and discard such bundles. One purging mechanism is referred to as Periodic Global Purge (PG-Purge). PG-Purge consists of PURGE messages that are generated at destination endpoint nodes 110. When a bundle reaches its destination node D, node D sets a timer $T_{prg}$ for a configured period if it is not already set. Then, it collects the packet and/or message identifiers, e.g., GBOF_IDs (Global Bundle or Fragment Identifier), of the bundles it receives. Upon receipt of at least $N_{div}$ bundles since the most recent sending of a PURGE, or upon expiration of $T_{prg}$, a PURGE bundle is created containing the collected GBOF_IDs of all of the bundles delivered within that period at node D. That is, only the IDs that were not included in any of the previous PURGE messages are included in this PURGE message. Implementation-specific compression of this may be done (e.g., indicating a range with exceptions).

The timer $T_{prg}$ is then reset when a new PURGE message is created. A sequence number Q, unique to the node, is then placed in the PURGE message. Thus, the (D, Q) tuple is globally unique in this embodiment. Further, a lifetime L for the PURGE message is included. L may be set as the maximum of the lifetimes of the successfully received bundles that were included in the PURGE message. The idea, in one embodiment, is that it is not useful to have the PURGE message live longer than the expiry time of the bundle it is purging. An alternative is to put in the average time or half the average time because it may be more efficient to wait some more time and let the bundles expire rather than take up bandwidth by sending PURGE messages throughout the network 100.

The PURGE message may be epidemically routed through the network 100 using standard epidemic routing techniques. The tuple (D,Q) may be used to identify duplicates and a summary vector exchange may ensure that only missing PURGE messages are exchanged. In the context of certain DTN networks architectures, a PURGE message may be an "injected bundle." A node 110 receiving a PURGE message deletes all bundles indicated in it, if present. A PURGE message may be deleted when the current time exceeds the lifetime tag contained in the message.

An optional enhancement to the PG-Purge procedure of module 314 is to initiate a purge only if a particular bundle has been replicated or replicated enough that a purge is warranted. This prevents purges from being sent when single copy routing was used. Determining accurately how many times a just-arrived-bundle has been replicated is a hard problem. In one embodiment, a node 110 employs a simple strategy that does not require any information in the bundle itself (e.g. no extension blocks). The destination node D keeps a count of duplicate bundles, and only when the count exceeds a certain threshold $C_{dup}$, is the PURGE mechanism activated for that bundle. If $C_{dup}$ is set to 0, it falls back to the unenhanced scheme.

PURGE messages may compete for buffers and bandwidth with both control messages (link-state updates) as well as bundles. The relative priority of a PURGE message, in both cases, may be defined by the forwarding mechanism that uses PG-Purge. The overhead due to PG-Purge illustrates an interesting tension where if a system waits too long to send purges, the buffers are inefficiently used by the bundles (i.e., bundles sit around longer than necessary). If the system sends more frequent purges, the overhead may be excessively high. In certain embodiments, a mathematical analysis and simulation is employed to dynamically adjust the purge periods, purge message frequency, and/or purge message amounts in a network 100 and/or node 110.

In one embodiment, a Prioritized Epidemic (PREP) routing scheme is employed to provide enhanced bundle routing for a DTN and/or MANET network to address a need for reducing the storage of a replication oriented scheme. More particularly, under certain conditions, a network should maximally replicate to equal the power of a fully available schedule, but reduce the storage requirements by biasing bundles on an eventual relay probability in addition to purging. These ideas form the basis for such a novel variant of Epidemic Routing, referred to as PREP, which uses a set of priority functions for transmitting and eliminating bundles. The eventual relay probabilities may be approximated using the cost (based on the average availability metric) to the destination node D.

In certain embodiments, each bundle is assigned a drop priority $P_d$, and a transmit priority $P_t$ in a manner described later herein. Both $P_d$ and $P_t$ can be any real number where, in one configuration, a lower value indicates higher priority. When a contact C becomes available, bundles with a lower value of $P_t$ are sent before bundles with a higher value of $P_t$. When the allocated buffer for bundles is full (or nearly full), bundles with a higher value of $P_d$ are deleted before bundles with a lower value of $P_d$. In both cases, ties may be broken randomly. Under a low load, PREP works like pure Epidemic Routing because resources are plenty and the priority scheme exists but is never invoked.

In general, a number of schemes can be used to assign transmit and drop priorities to bundles. In one embodiment, a specific scheme for PREP is provided. In at least one implementation, the transmit and drop control functions are modular such that various types of control functions may be added or removed. In one embodiment, a bundle drop procedure is included where each bundle has a field that contains a hop count, i.e., the number of hops the bundle has traversed thus far. The source node S may initialize the hop count to zero and every node 110 that receives a bundle increments the hop count field. Alternatively, each recipient node 110 may estimate the number of hops based on its knowledge of the source EID and the topology.

With regard to transmitting and/or routing bundles, in certain embodiments, each node 110 maintains a low water mark (e.g., low threshold) and high water mark (e.g., high threshold) for buffer occupancy. A dropping procedure is initiated whenever the buffer occupancy exceeds the high water mark. The procedure is stopped when the buffer occupancy falls below the low water mark. The use of two marks prevents the dropping procedure from being constantly invoked.

Drop priority of bundles may be calculated as follows: First, bundles that have a hop count value greater than or equal to a configured threshold V1 (e.g., 3) are identified. For these bundles, a node 110 assigns a lower priority to bundles that have a higher shortest path cost to the destination as determined by the route computation procedure discussed above. Specifically, the priority $P_d(B)$ of a bundle B is equal to the shortest cost path from the current node 110 to the bundle's destination node D.

In one embodiment, the bundles are deleted in decreasing order of $P_d(B)$ until either the buffer occupancy falls below the low water mark or all taken bundles have been deleted. If all (remaining) bundles have a hop count value less than $V_{hc}$ and the buffer occupancy is still above the low water mark, these bundles are deleted randomly. This bundle drop procedure has the effect, during a buffer crunch, of building a gradient of replication density centered at the destination of the replicated bundles. In other words, more copies are maintained near the destination, letting copies further away be deleted.

Figures 4A, 4B:
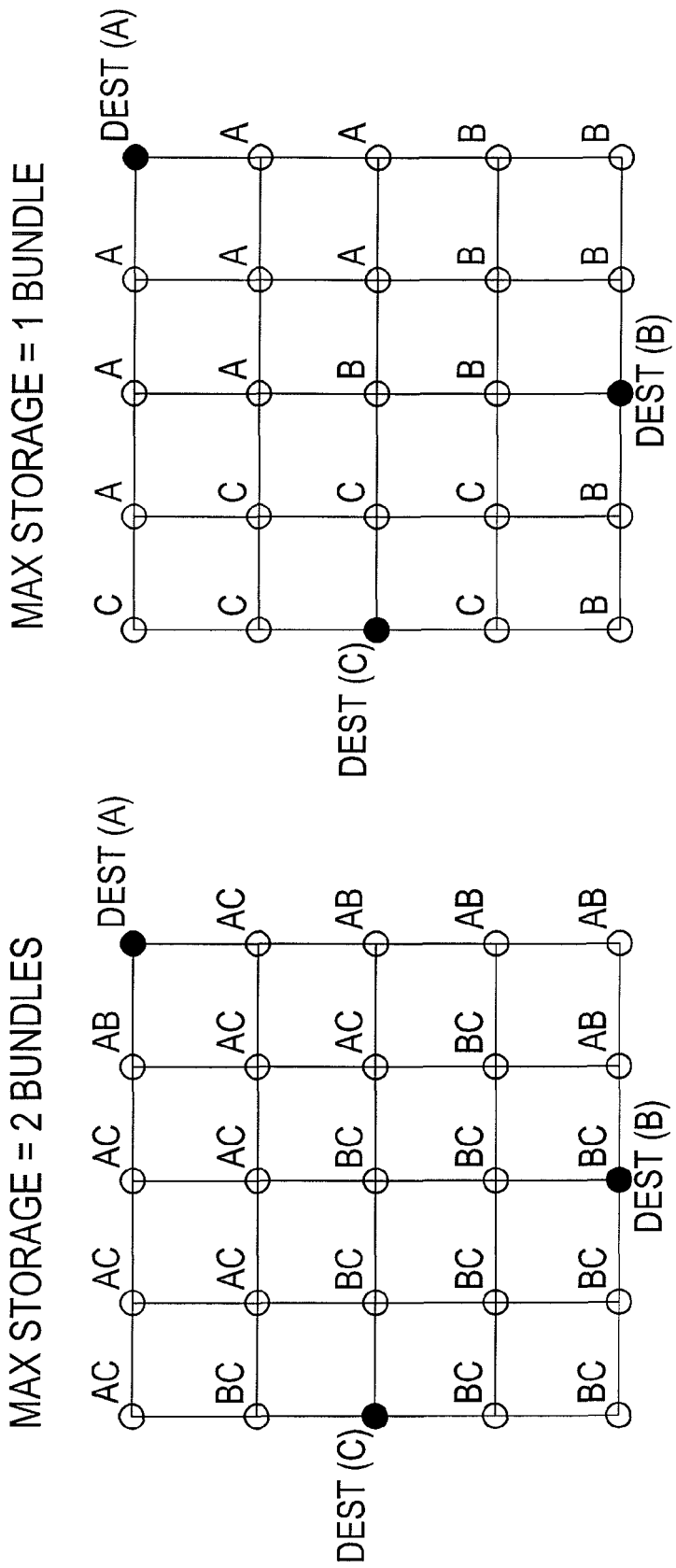
FIGS. 4A and 4B show examples of the distribution of bundles due to PREP operation according to illustrated embodiments of the invention.

FIGS. 4A and 4B show examples of the distribution of bundles due to PREP operation according to illustrated embodiments of the invention. The lines represent highly intermittent links 120. Three bundles A, B, C are replicated with an intent to deliver to destinations as shown. Storage limitations at each node force the dropping of bundles. FIG. 4A shows the case when one bundle needs to be dropped. FIG. 4B shows the case when two bundles need to be dropped. In both cases, PREP's strategy clusters bundles around their destinations to improve bundle and/or packet delivery probability.

The use of a hop count, in certain embodiments, allows bundles to get a head start before being considered for deletion. A transmission procedure in PREP may be invoked whenever contact is made by a node 110 with a peer to whom no transmission has taken place in the last $T_{sync}$ seconds. The transmission procedure may include the usual epidemic exchange of missing bundles. Briefly, summary vectors describing content may be exchanged and then missing bundles are sent from one to the other. Which bundles are transmitted first in either direction depends upon the transmit priority assigned to them at the holding node 110.

The transmission priority may be based on at least two factors: 1) whether the peer to which transmission is to be done has a smaller cost to the destination node D, and 2) on the time-to-expire of the bundle. For example, suppose the transmission procedure is invoked for a peer P for a bundle B whose destination is node D. Then, if the cost of the shortest path from P to D is less than or equal to the cost of the shortest path from the current node to D, then B is placed in a "downstream" bin, else it is placed in an "upstream" bin. The downstream bin may be selected first and higher priority may be given to bundles whose expiry time is nearer.

In one exemplary implementation, the priority $P_t(B)$ of a bundle B is equal to its ranking in a radix sort on RM(expiryTime(B)−currentTime) and RM(creationTime−currentTime). The radix sort (or lexicographic/postal sort) sorts first by the most significant element (former) and then by the next most significant element (latter) and so on (only 2 in this case). "RM" means rounded to the nearest minute. Ties are broken randomly. In the case that expiry times are not given (e.g., infinity), the bundles that have been around longer get higher priority. In certain instances (creationTime−currentTime) may be a negative value and/or integer. If the contact node 110 is still open and available to receive bundles, the "upstream" bin is selected and all bundles there are transmitted. Once again, priority is given to bundles with lower time to expire, just as was done with downstream bundles. In certain embodiments, sorting is performed based on a single value given by: a*(current−creation)+b*(expiration−current) for certain real numbers 0<a, b<1, which indicate which of the two time difference is preferred for scheduling.

In certain embodiments, topology awareness messages have lower transmission priority than data messages, bundles, and/or packets because the primary mode of communication is Epidemic and the topology awareness messages that are used for dropping only. In one embodiment, PREP uses PC-Purge as a purging mechanism. Thus, when a bundle is delivered to its final destination, that node may initiate the PG-Purge procedure as described previously. PC-purge messages may have a higher priority than data messages.

In certain embodiments, PREP may include features similar to MaxProp as described by Burgess et al., *MaxProp: Routing for Vehicle-Based Disruption-Tolerant Networks*, INFOCOMM 2006, April 2006. Similarities may include use of priorities, use of Acks/Cure, head start for newly born bundles, and non-deletion of forwarded bundles. Differences include the use of topology/delivery probability information. In PREP it is used to delete, not to forward, and hence PREP is closer to Epidemic. Differences also include the use of epidemic link-state and Dijkstra, and the use of different priorities for dropping and transmitting.

In certain instances, PREP works best (relative to other possible solutions) in an environment of light load relative to buffers, and highly disruptive/random network connectivity. Even when resources (communication capacity and/or buffers) are taxed, PREP can maintain more copies nearer the destination while letting copies further away decay and, thereby, building a gradient of replication density. Prioritizing transmission based on expiry/creation time aims at reducing overall delay while giving more resource share to more urgent bundles (e.g., proportional fairness).

Anxiety-Prone Link State (APLS) extends PREP by adding a mode in which single-copy (un-replicated) shortest cost path routing is employed using the topology awareness provide by module 302. Thus, a given bundle at a given node 110 may be forwarded in one of two ways: 1) exactly as in PREP or 2) very similar to a conventional MANET routing protocol. The decision of which mode to use depends upon the relation of the cost to the bundle's destination node D and a configured parameter called the anxiety threshold $\alpha$. For example, if the cost is higher than $\alpha$, then the bundle is treated exactly as in PREP. If the cost is lower than $\alpha$, it is sent to the next hop along the shortest cost path. The mode selection, in one embodiment, is done on a per (node, bundle) basis. Thus, different bundles in the network at a given time may be using different modes.

Figure 5:
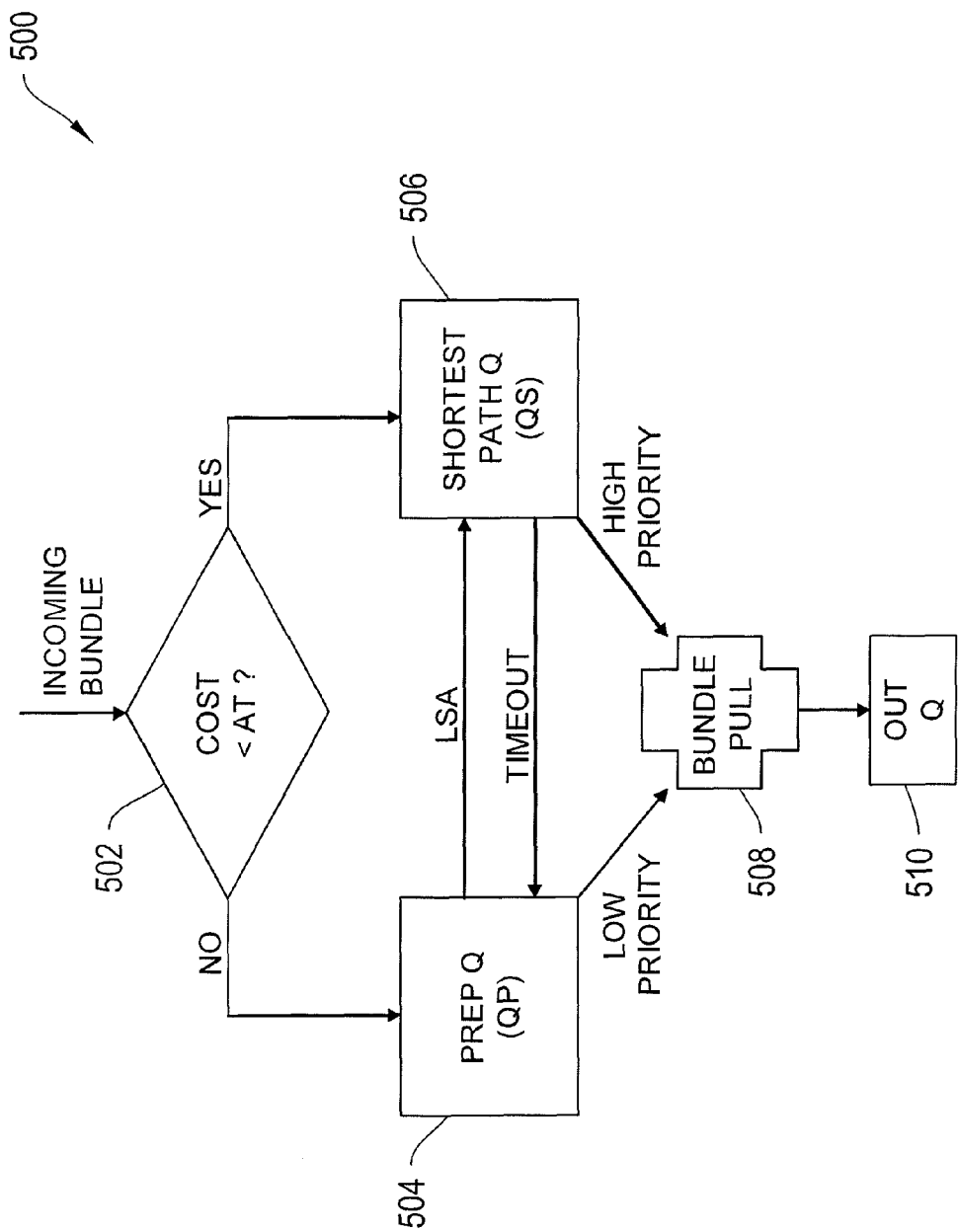
FIG. 5 is a flow diagram of a process for routing a data bundle in a network based on APLS according to an illustrative embodiment of the invention.

FIG. 5 is a flow diagram of a process 500 for routing a data bundle in the network 100 based on APLS according to an illustrative embodiment of the invention. When a data bundle arrives at a node 110, the cost of the path to the bundle's destination node D is determined by the topology awareness module 302. If the cost is greater than or equal to the configured anxiety threshold (AT), $\alpha$, then the data bundle is placed in the PREP Queue (QP). If the cost is less than $\alpha$, then the data bundle is placed in the shortest path queue (QS), along with the information about its next hop (Step 502). Bundles in QP are processed as described previously based on PREP (Step 504). For example, the bundle transmit priority procedure is applied to bundles in QP to take bundles out of QP and put them into the outgoing queue. QS may be sorted in order of non-increasing cost to the destination node D of the data bundle (Step 506). The bundle drop priority procedure is also applied to QP with the size of QP being limited by the configuration parameter. Further, any "I have" lists are generated only using bundles in QP.

Data bundles are de-queued from QS and QP (Step 508) and placed in the outgoing queue (Step 510). Priority may be given to QS over QP, except for data bundles whose next hop does not currently have an adjacency to this node. For example, first all bundles in QS whose next hop nodes are "up" are processed and sent to the outgoing queue (Out Q). If it is time to perform Epidemic sync for PREP, then that is done. When a bundle is de-queued from QS to be sent, it is removed from the node. That is, no copy of the bundle is retained. When a bundle is de-queued from QP to be sent, a copy is retained according to PREP/Epidemic rules. Each time a link 120 comes up or is established, QS is processed to see if there is any bundle in the queue that can now be sent to the link 120.

Each time an LSA is received, QP is processed to see if there are any bundles whose cost has fallen below a. Such bundles are moved to QS and receive the processing and/or treatment described earlier. If a bundle placed in QS is not moved to the outgoing queue within a configured period of time, the bundle is moved to QP. This may happen in situations where the link cost information is excessively delayed or erroneous, causing the route generation function to declare a low cost path through a neighbor that takes an unusually long time to appear (e.g. in scheduled links).

The mode employed by APLS to go from the current node C and to the destination node D of a bundle depends upon the nature of the network between C and D, which impacts not only the best mode to use, but also the timeliness of the link state information received from that "region" of the network.

If node C and the destination node D are separated by a network region of high-availability links, the cost from node C to node D is likely very low and below the anxiety threshold α. Thus, SPF single-copy shortest-path forwarding will be used based on the disseminated information, which is likely to be up-to-date. If the network between node C and node D is spotty and includes high cost paths, or if node C and node D are in different partitions, then α is exceeded and node C replicates bundles as per PREP, which soon is present in all of the nodes in the partition, eagerly awaiting a mule (for instance). This is intuitively the kind of behavior preferred in these situations and/or network conditions.

In certain embodiments, the check against the anxiety threshold is done at every node 110 afresh. Thus, if a bundle is replicated, spreads, and encounters a node 110 with cost below the anxiety threshold α, the bundle simply forwards conventional SPF style to the destination node D. If the information was somehow wrong and the bundle finds its cost has suddenly increased, the node 110 and/or network 100 switches back to epidemic routing and so on. Thus, for the network 100 as a whole, there may be a mix of Epidemic-style and SPF-style routing occurring simultaneously at varying proportions over time and bundles. A characteristic of DTNs is that routing control information itself is challenged in propagating to network nodes, and thus, evaluating the strategy to use afresh at each node 110 makes sense.

In one embodiment, the AT may be adjusted and/or configured based one or more conditions and/or considerations. Setting α too high will cause APLS to use shortest-path when PREP would have been better, and vice versa. Setting a to zero should cause APLS to behave exactly like PREP. Setting a to infinity should cause APLS to behave exactly like shortest-path ("MANET") routing. The choice of an appropriate a may depend upon the cost function used. If the linear cost function is used, then for networks with diameter=10, a reasonable choice might be α=1.2. With this, a 10 hop path with AA≧0.9 for each link, a 4 hop path with AA≧0.8 for each link, a 2 hop path with AA≧0.5, and so on, will get shortest path treatment. Different values of AA may be used in different regions of a DTN network.

There may also be a dependence on how quickly the AA responds to events. If it is slow, for example, the AA may take a while to crawl up to 1 when links 120 come up thereby persisting with PREP for more time than necessary. Thus, one or more of the cost function, α, the neighbor discovery and link state updating should be accounted for.

In one embodiment, APLS uses PG-Purge as a purging mechanism. Thus, when a bundle is delivered to its final destination, that node 110 initiates the PG-Purge procedure as described previously. In APLS, PG-Purge messages have the lowest priority. In APLS, unlike PREP, topology awareness messages are given a higher priority than data bundles. This is because topology awareness is far more crucial since it is used to route bundles. If α is set to 0, then APLS works identical to PREP. Similarly, if a is set to infinity, then APLS works like a conventional MANET protocol (modulo the somewhat different, use of the link metrics). Thus, in certain embodiments, APLS subsumes PREP.

In another embodiment, a SPINDLE DTN provides enhanced data bundle routing for data networks. SPINDLE stands for Survivable Policy-Influenced Net-working Disruption-tolerance through Learning and Evolution. A SPINDLE DTN system and related technology may utilizes an open-source, standards-based core with a plug-in and/or modular architecture and well-specified interfaces. In certain embodiments, SPINDLE technology innovations include: (i) routing algorithms that work efficiently across a wide range of network disruption, (ii) a name-management architecture for DTNs that supports progressive resolution of intentional name attributes within the network (not at the source), including support for "queries as names" and name-scheme translation, (iii) distributed caching, indexing, and retrieval approaches for disruption-tolerant content-based (rather than locator-based) access to information, and (iv) a declarative knowledge-based approach that integrates routing, intentional naming, policy-based resource management, and content-based access to information.

Figure 6:
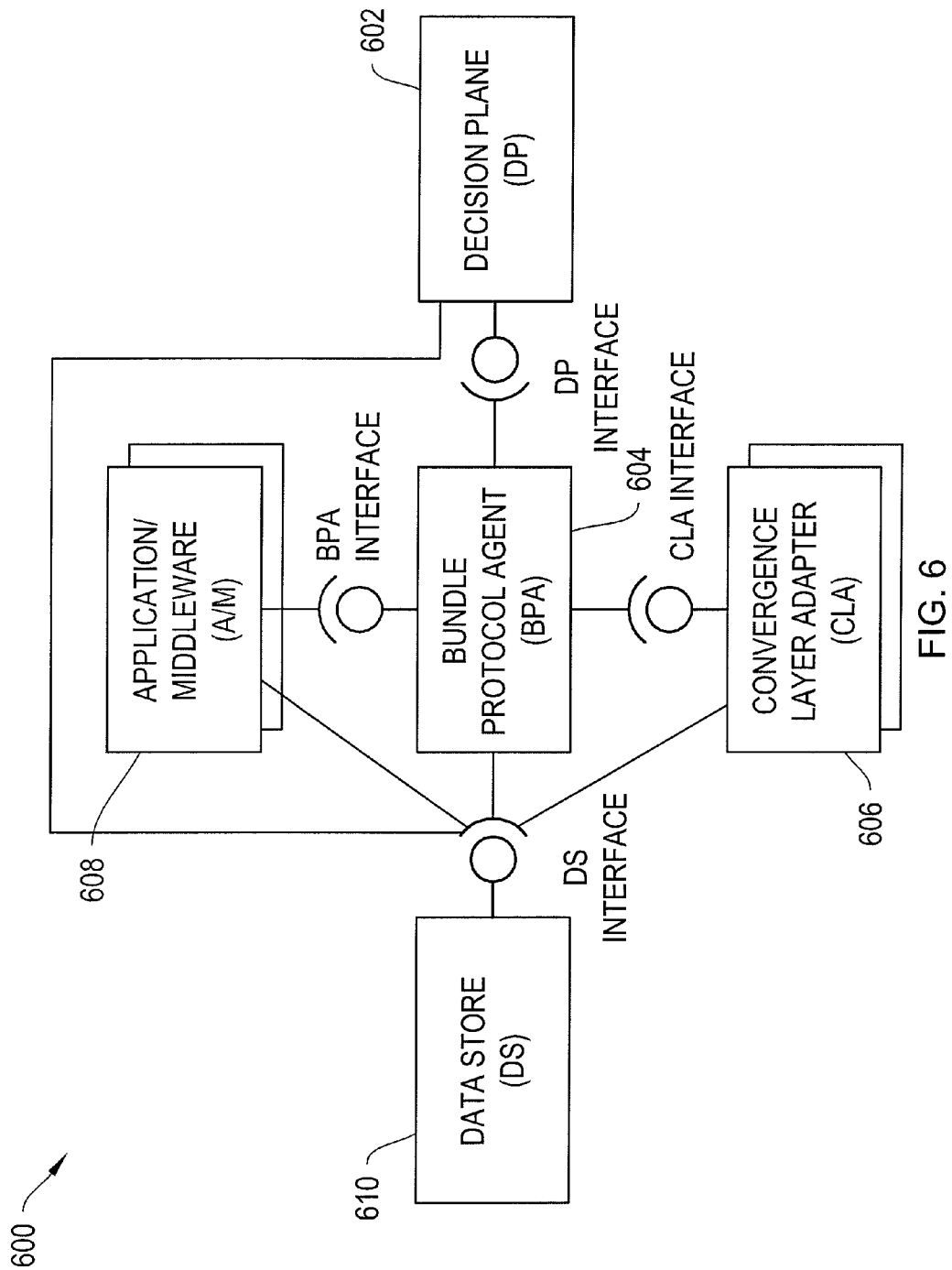
FIG. 6 is a functional block diagram of a SPINDLE DTN architecture according to an illustrative embodiment of the invention.

FIG. 6 is a functional block diagram of a SPINDLE DTN architecture 600 according to an illustrative embodiment of the invention. The architecture 600 includes at least one of a decision plane (DP) 602, a bundle protocol agent (BPA) 604, a convergence layer adapter (CLA) 606, an application/middleware (A/M) 608, and a data store (DS) 610. Communications between the BPA 604 and other elements may include an intercomponent communications protocol such as, without limitation, XML messages that are exchanged over at least one of multicast or unicast socket. Various elements of the architecture 600 may be implemented on one or more nodes of a network such as the nodes 110 of network 100. Various functions, modules, routines, and/or applications may be implemented in software and/or hardware by, for example, a process environment such as described with respect to FIG. 2.

In one configuration, the BPA 604 includes functions such as, without limitation, bundle forwarding, fragmentation and reassembly, custody transfer mechanisms, delivery to applications, deletion, sending administrative bundles including status reports, and security functions. The BPA 604 may execute procedures of the bundle protocol and a bundle security protocol (BSP) with the assistance of other system elements. In one embodiment, the BPA complies with the DTNRG specifications for the BP and the BSP. The BP and BSP are described in further detail in the *Bundle protocol specification*, IETF RFC 5050, K. Scott and S. Burleigh, April 2007 and the *Bundle security protocol specification*, draft-irtf-dtnrg-bundle-security-02, S. Symington, S. Farrell, H. Weiss, and P. Lovell, April 2007, the entire contents of both of which are incorporated herein by reference.

The BPA may manage links and support at least five types of links as described in *Delay-tolerant network architecture*, IETF RFC 4838, V. Cert. S. Burleigh. A. Hooke, L. Torgerson, R. Durst, K. Scott, K. Fall, and H. Weiss, April 2007, the entire contents of which are incorporated herein by reference. The BPA 604 may include a bundle protocol agent interface that can be accessed by applications and may use the DP 602 interface, CLA 606 interface, and the DS 610 interface. The BPA 604 may implement the mechanisms of the bundle protocol while certain decisions (e.g., based on policies and/or optimization strategies) that are required during execution of the mechanism are performed by the DP 602.

In at least one configuration, the SPINDLE DTN architecture 600 includes a decision plane (DP) 602 having four modules, functions, routines, and/or applications:
1) Policy module. Basic functions include interpretation and enforcement of user-specified policy. One embodiment includes an "event-condition-action" design that mediates the communications between the bundle protocol agent (BPA) 604 and the rest of the DP 602. Alternatively, the module allows for a style of "consultation" if needed.
2) Router module: Functions of a router module may include unicast and multicast route computation, generation of next hop(s) for bundles, replication and forwarding, bundle scheduling, and decision to take custody of a bundle, or to discard a bundle. In addition, the router module may be responsible for determining the network state to distribute, and to whom, and when. It may also be responsible for gathering network state from incoming dissemination bundles and the local convergence layer adapters (CLAs) 606. Future, BPAs 604 may support additional forwarding and scheduling functionality configurable through "rules" for enhanced performance. In such cases, the router module will configure these general rules rather than provide separate forwarding decisions for each bundle.

3) Naming and Late binding module: This module may maintain and opportunistically share name ontologies (or other schemes) among DTN nodes. Late binding is described later herein. This module may be called upon to resolve rich intentional names to canonical endpoint identifiers of care-of nodes that are subsequently used by the router module. This module may also be responsible for registration and dissemination or synchronization of name KBs (e.g., intentional name to canonical name bindings stored within).

4) Content-based access module: This module may be responsible for content caching/replication, distributed indexing, and content-addressable search. This may use several services from other DPs 602, e.g., dissemination, late binding, and/or external router.

The SPINDLE DTN architecture 600 may include a Convergence Layer Adapter (CLA) 606. The function of the CLA 606 may include sending and receiving bundles on behalf of the BPA 604. The CLA 606 may achieve this by utilizing the services of a native protocol, which is supported in one of the underlying networks of which the node 110 is homed. The CLA 606 may therefore adapt the data transmission service provided in the underlying network (e.g., TCP/IP, Bluetooth, Wifi, Ethernet, and/or other tactical links) to an abstract bundle transmission service that presents itself to the BPA 604.

A CLA 606 may be responsible for discovering and maintaining information about links such as links 110 of FIG. 1. In one embodiment, a measurement process in the CLA 606 can track and update the values of link attributes such as status, schedule, data rate, and delay. The CLA 606 may provide link information to the BPA 604 by posting events. This information may then get relayed to the DP 602 and may also be stored in the DS 610. The DP 602 may pass messages to the CLA 606 (via the BPA 604) to configure certain convergence layer parameters.

The data store (DS) 610 module may provide a persistent storage service and be responsible for storing bundles, bundle metadata, knowledge about bundle metadata, network state information (routing tables, name ontology data, content metadata, policy rules), and application state information (registrations and other metadata). The DS 610 may provide a service that is accessible from all other components of the system. In order to cater to a wide spectrum of deployment scenarios, a DS 610 may exist in one of the following incarnations of increasing capability:

1) Key-value: A simple key-value store that allows other modules to add, retrieve and delete key-value pairs. Bundles, bundle metadata and/or network state information can exist in such a store. This may be applicable for resource-limited devices such as battery-powered sensor nodes 110.

2) Database: A relational database (e.g., based on an RDBMS) that allows other modules to add, delete, and get elements with multiple fields (by its key).

3) Knowledge Base: A knowledge base (KB) that supports deduction or inference by means of execution of rules (e.g., Prolog style) on stored facts. A KB may include support for data storage, either internally, or via a back-end storage system such as MySQL or Berkeley DB.

The application and middleware (A/M) agent 608 may use the BP services to transmit and receive bundle payloads.

In certain embodiments, there are four public interfaces defined for the SPINDLE system and/or architecture 600:

1) The BPA 604 may implement the BPA interface that can be used by the A/M 608 and DP 602 to send and receive bundles.

2) The DP 602 may implement the DP interface that is accessed by the BPA 604 to serve various decision points identified in the BP such as routing, scheduling, name resolution, custody acceptance, and storage management.

3) The CLA 606 may implement the CLA interface which may be accessed by the BPA 604 for bundle transport and link management.

4) The DS 610 may implement the DS interface for storing bundles, bundle metadata, application registrations, connectivity information, and other system state. The DS interface can be accessed on a system-wide basis by all or a portion of the architecture 600 elements. The CLA 606 may access the DS interface for storing and retrieving connectivity information that is discovered or scheduled/specified. The DP 602, for example, may access the DS interface for storing and retrieving information related to routing, naming, policy, and content caching/indexing.

In one embodiment, there are four kinds of interface messages: event, request, query, and report. There may also be link-specific and bundle-specific messages for each message type. Request and event messages may be loosely tied, but there may be a tighter coupling between query and report messages. All messages may be transparently and reliably delivered by an intercomponent communication protocol such as one based on XML.

In various embodiments, elements of the SPINDLE DTN architecture 600 operate to performs functions including adaptive DTN routing based on, without limitation, the PREP and APLS as describe previously herein.

In traditional well-connected networks such as the wired Internet or terrestrial and cellular networks, destination names (e.g., DNS names) are typically resolved at the source to a canonical name in a mutable namespace of identifiers (e.g., IP addresses). This is typically facilitated by a quasi-static hierarchy of name resolution databases (e.g., DNS hierarchy) that can be consulted by the source to perform resolution.

In networks subject to disruption, such information to map destination names to mutable canonical destination identifiers may not be readily available at the source. Also, the nodes that may have such information may not be readily reachable from the source. For example, the SPINDLE DTN architecture 600 envisions the use of richly attributed names for addressing endpoints which the source may be unable to "bind" to routable canonical names. Intermediate nodes in the network (or even the destination) may perform the resolution. This process of deferred name resolution is referred to as late binding.

In one embodiment, a late binding module of, for example, DP 602, addresses the problem of progressively resolving the destination name (denoting individual, group or service endpoints) to the canonical name of a care-of node which either corresponds to the destination node D or can further the process of determining the canonical names of the destination node D. In certain embodiments, this process must continue until the canonical name(s) of node(s) 110 to which the destination node name is bound becomes known.

Key components of the SPINDLE late binding architecture and mechanism include an expressive name scheme based on a declarative logic language (e.g., Prolog, Frame logic etc.), addition of a metadata extension block to the bundle protocol to carry information for name resolution, use of knowledge bases to store name management and resolution information, publish-subscribe mechanisms to exchange name management information, and name resolution procedures that are performed on DTN nodes. Deductive databases are a possible means to implement this architecture.

Figure 7:
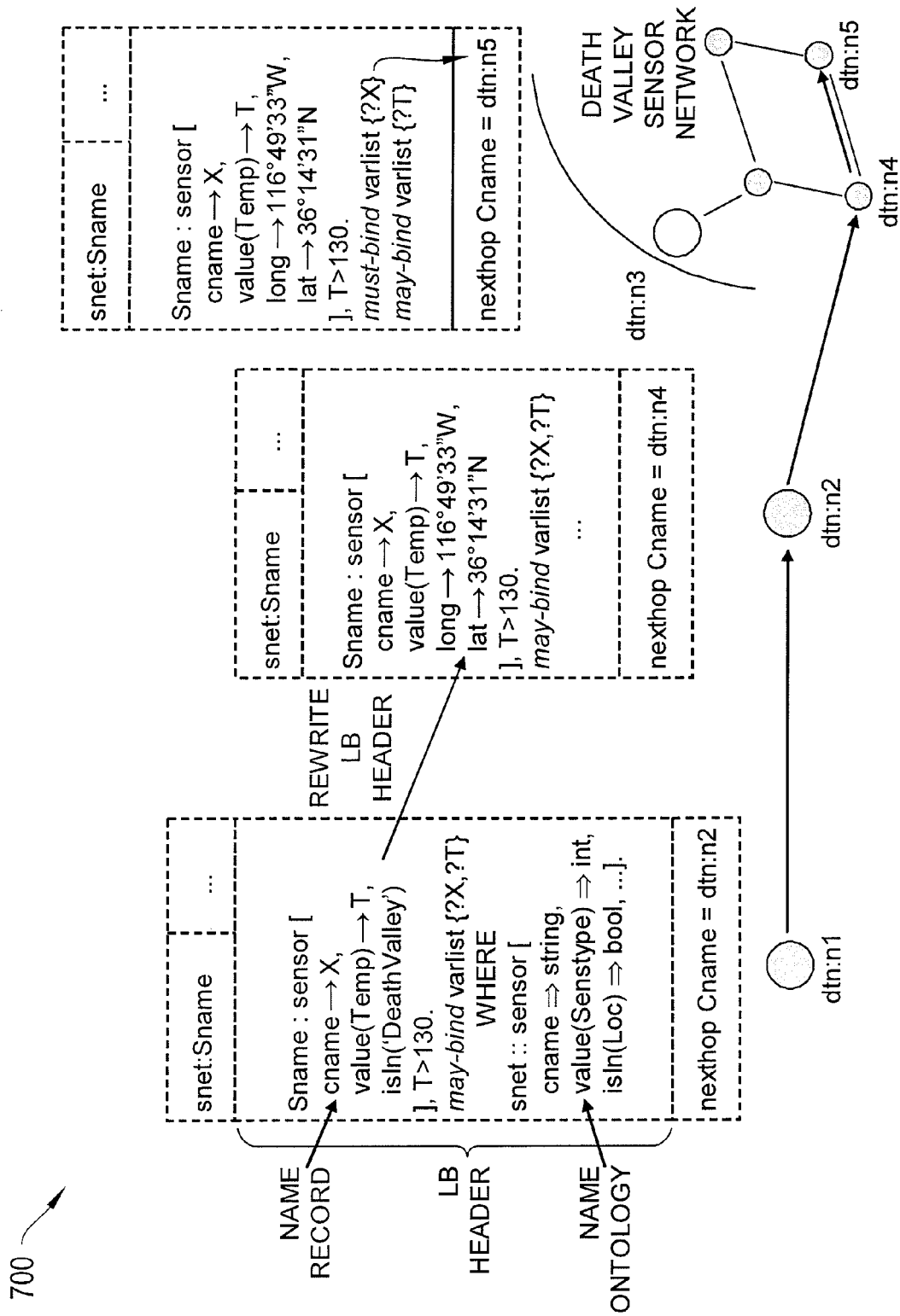
FIG. 7 illustrates the process 700 of progressive resolution of a multi-attributed intentional name according to an illustrative embodiment of the invention.

FIG. 7 illustrates the process 700 of progressive resolution of a multi-attributed intentional name according to an illustrative embodiment of the invention. FIG. 7 also denotes all sensor nodes 110 in a name schema "snet" that are temperature sensors located in Death Valley, Calif., and are reporting temperature above 130 F. Such names are essentially queries into a distributed database of name attributes that can be potentially satisfied by multiple nodes 110 in the network 100.

The SPINDLE DTN architecture 600 allows for both the case in which intentional name resolution and bundle routing are decoupled from each other, and the case in which they operate together or hand-in-hand. The former may be more relevant in scenarios involving the mere translation of a name from one namespace to another, but not necessarily for routing. For example, a bundle with an encrypted destination name may get decrypted at a security gateway to a name known within the secure network.

Integrated resolution and routing is very useful in DTN when progressive resolution of name attributes can help in the routing process. A case in point is the "isIn (Deathvalley)" attribute in the example in FIG. 7. This attribute cannot be resolved at the source node dtn:n1, but the bundle is forwarded to an intermediate node dtn:n2 that possesses GIS databases and, hence, can resolve this attribute to the latitude/longitude coordinates for Death Valley. This new information is written into the metadata extension block in the bundle. When the bundle is routed to a node dtn:n4 belonging to the Death Valley sensor network, the canonical name in the bundle is bound to dtn:n5, which is reporting a high temperature above 130 F. The exact value of the temperature can be known only after the bundle reaches the latter.

Currently information access on the Internet is based primarily on the location of content. For example, a user needs to provide a universal resource locator (URL), which includes a DNS name that must be resolved at the source. Two key technologies significantly enhance our ability to efficiently access information on the Internet. The first is the indexing and search infrastructure that enables one to access information by collecting and maintaining ex past facto mappings of content to location. The second key technology is a caching infrastructure that maintains a mapping from content location to a cache location. Caching can reduce end-user latency and also alleviate the load on servers and access networks.

These two technologies have completely transformed the way we access information over the Internet. They are, however, based on assumptions of strong connectivity to the Internet, which means they are not tolerant to disruption. Content-based access is possible only when access to the search infrastructure is available. The consistent-hashing algorithms that are the basis of extensive caching infrastructure on the Internet assume strong connectivity to the caching hierarchy.

Suppose we want a map of Baghdad and a neighboring node (within a mobile ad-hoc network cluster) has cached the map of Baghdad from a particular map provider. In the existing approach, there is no easy way to discover and take advantage of this fact. There is a need to first connect to a search engine, identify one or more locators that matches "map of Baghdad," then traverse a hierarchy of caches until the user can successfully connect to a cache that has the content corresponding to one of the locators. Any of these steps could be easily disrupted.

In order to support disruption-tolerant access of information based on content, embodiments of the invention include approaches for opportunistic caching, indexing, and retrieval of data in a distributed fashion in a manner that maximizes the availability of information required for the mission even when disconnected from the Internet (e.g., when access to a global caching infrastructure or search engine is unavailable).

In novel approach, users simply describe what they want, not where it is stored, and the network 100, using one or more nodes 110, moves information when and where it is needed. Certain embodiments include a disruption-tolerant publish-subscribe system that supports push, pull, and third-party push metaphors. Content flow and caching self-organizes around supply (e.g., who provides what) and demand (e.g., who needs what). Supply and demand are disseminated within the DTN. Through a rule-based framework, the SPINDLE DTN system allows content-flow policies to be specified in a flexible manner and through an ontology-based approach. The SPINDLE DTN system allows for rich descriptions of content, services, and endpoints in conjunction. The SPINDLE DTN system may include an application that allows users to access information under disruption through a familiar web-browser facade.

The SPINDLE DTN system and/or architecture 600 may use a declarative knowledge-based approach to integrate routing strategy selection, intentional naming, policy-based resource management, and content-based access to information. The knowledge base may facilitate the declaration of facts, rules, and queries. Thus, the knowledge base may capture system and policy knowledge and enable decision making on network nodes such as nodes 110 of network 100.

Other modules of the DP 602 may query the knowledge base using a declarative query language. The knowledge base may also allow users to define rules in order to derive complex facts from simple ones. For example, a predicted future adjacency from a ground node to a UAV node may be represented as a (first order) Frame logic rule as follows:

predictedAdjacency::spindleAdjaceney.
S:predictedAdjacency [fromNode->X,
toNode->U, adjType->'PREDICTED',
adjUpAt->T1, adjDownAt->=2]:—
walltime (Tnow),
U[trajectory->Tr1], X[trajectory->Tr2],
trajectory_xing (Tnow, Tr1, Tr2, [T1, T2]),!.

The knowledge base may expose such facts (both simple and complex) to the DP 602 using a uniform interface. Rules may be executed internally to retrieve derived facts. For example, a routing algorithm could make use of derived predicted adjacencies as well as other explicitly asserted adjacencies in its computations. The knowledge base may also support rules for content management, content and endpoint ontologies to express supply and demand information, ontologies for descriptive naming of endpoints, and/or policies. In one embodiment, each piece of content will be tagged with metadata describing it. Such metadata can be represented as a frame which may be a conjunction of multiple attribute-value pairs that can then be inserted as a fact in a persistent KB. For instance, a map of a certain portion of Baghdad may be described using:

ml:map [city->'Baghdad', country-->'Iraq',
minLat->'33:14:20:N', maxLat->'33:14:50:N',
minLon->'44:22:10:E', maxLon->'44:22:30:E',
creat->200601011200, modif->200603011500,
originator->'dun://n0', digSign->S1234,
cachedAt->{'dtn://n1', 'dtn://n32 },
shalCheck 23412456, blobKey->'ml' ].

User demand for content may be fulfilled through a combination of query propagation and sharing of content metadata. Geographical queries such as "give me maps of the areas of Baghdad that are residential" may be supported by this architecture if appropriate rules are defined to resolve those queries and pertinent GIS data is available.

It will be apparent to those of ordinary skill in the art that methods involved herein may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

It is understood that the various features, elements, or processes of the foregoing figures and description are interchangeable or combinable to realize or practice the invention describe herein. Those skilled in the art will appreciate that the invention can be practiced by other than the described embodiments, which are presented for purposes of illustration rather than of limitation.

What is claimed is:

1. An adaptive router in a communications network comprising:
    a receiver for receiving a data bundle, the data bundle originating from a source node and having a designated destination node, and
    a processor for i) determining a routing cost associated with delivering the data bundle from the router to the destination node, ii) comparing the routing cost with a threshold value, iii) in response to the routing cost being greater than or equal to the threshold value, further processing the data bundle based on a first routing protocol and, in response to the routing cost being less than the threshold value, further processing the data bundle based on a second routing protocol, and iv) forwarding the data bundle using the selected first or second routing protocol.

2. The router of claim 1, wherein the receiver receives topology awareness information from one or more other nodes in the communications network.

3. The router of claim 2, wherein the topology awareness information includes link availability information associated with one or more communications links between a plurality of nodes of the communications network.

4. The router of claim 3, wherein the routing cost is based, at least in part, on the availability information.

5. The router of claim 4, wherein the threshold is at least one of predetermined or dynamically set.

6. The router of claim 1, wherein the first routing protocol includes prioritized epidemic routing.

7. The router of claim 6, wherein the second routing protocol includes a shortest cost path mode.

8. A method for routing packets in a communication network, comprising
    receiving a packet at a first node in a communication network having a plurality of nodes;
    determining a route quality parameter of a communication channel between at least two of the plurality of nodes in the communication network; and
    selecting a protocol for transmitting the packet from the first node to at least a second node of the plurality of nodes in the communication network based on the route quality parameter, wherein selecting a protocol comprises determining whether the packet is likely to be transmitted with sufficient reliability using a first transmission protocol by comparing the route quality parameter to a threshold.

9. The method of claim 8, wherein the communication network includes at least one of mobile and wireless nodes.

10. The method of claim 8, wherein a first portion of the communication network exhibits characteristics of a disruption tolerant network and a second portion of the communication network exhibits characteristics of a connected mobile ad hoc network.

11. The method of claim 10, wherein the first and second portions of the communication network change over time.

12. The method of claim 10, wherein the route quality parameter includes at least one of a delay, a bandwidth, and an availability measure of at least one of the plurality of nodes in the communication network.

13. The method of claim 12, wherein the availability measure is an average availability.

14. The method of claim 8, wherein if it is determined that the packet will not be transmitted with sufficient reliability using the first transmission protocol, selecting a second transmission protocol to transmit the packet.

15. The method of claim 14, wherein at least one of the first and second transmission protocols is a shortest-path routing process.

16. The method of claim 14, wherein at least one of the first and second transmission protocols is an epidemic routing process.

17. The method of claim 16, further comprising determining a prioritized list for transmitting the packets.

18. The method of claim 16, further comprising determining a prioritized list for dropping the packets.

19. The method of claim 8, wherein if it is determined that the packet will be transmitted with sufficient reliability using the first transmission protocol, selecting the first transmission protocol to transmit the packet.

20. The method of claim 8, wherein the threshold is determined based on the contents of the packet.

21. The method of claim 8, wherein the threshold is determined based on a reliability requirement for transmitting the packet from the first node to a destination node.

22. The method of claim 8, further comprising transmitting the packets using the protocol.

23. The method of claim 8, wherein selecting a protocol comprises identifying a packet including network topology information, and in response, selecting a flooding protocol to transmit the packet.

24. A routing process for a communication network, comprising
    receiving packets at a first node in a communication network having a plurality of nodes, the first node having a buffer and a first threshold for buffer occupancy of the buffer;
    determining a routing parameter of a communication channel between at least two of the plurality of nodes in the communication network;
    determining a prioritized list for dropping the packets based on the routing parameter; and dropping, based on the prioritized list, at least one of the packets from the first node in response to the buffer occupancy of the buffer being greater than or equal to the first threshold.

25. The method of claim 24, wherein the communication network includes at least one of mobile and wireless nodes.

26. The method of claim 25, wherein a first portion of the communication network exhibits characteristics of a disruption tolerant network and a second portion of the communication network exhibits characteristics of a connected mobile ad hoc network.

27. The method of claim 26, wherein the first and second portions of the communication network change over time.

28. The method of claim 24, wherein the routing parameter includes at least one of a delay, a bandwidth, and an availability measure of at least one of the plurality of nodes in the communication network.

29. The method of claim 28, wherein the availability measure is an average availability.

30. The method of claim 24, further comprising transmitting at least one of the packets from a first node to at least a second and third node of the plurality of nodes in the communication network using a transmission protocol, wherein the transmission protocol further comprises identifying a packet using network topology information.

31. The method of claim 24, wherein
the first node further includes a second threshold for buffer occupancy of the buffer, the second threshold being less than the first threshold; and
wherein dropping the at least one packet comprises dropping at least one packet based on the prioritized list until a number of packets in the buffer equals the second threshold.

* * * * *